(12) United States Patent
Collibault et al.

(10) Patent No.: US 10,479,385 B2
(45) Date of Patent: Nov. 19, 2019

(54) MOTORIZED HANDLING TRUCK

(71) Applicant: R.S.A. CONCEPT, Ixelles, Brussels (BE)

(72) Inventors: Joseph Collibault, Brussels (BE); Gérard Lecomte, ST Martin des Besaces (FR)

(73) Assignee: R.S.A. Concept, Brussels (BE)

( * ) Notice: Subject to any disclaimer, the term of this patent is extended or adjusted under 35 U.S.C. 154(b) by 283 days.

(21) Appl. No.: 15/635,241

(22) Filed: Jun. 28, 2017

(65) Prior Publication Data
US 2018/0001918 A1   Jan. 4, 2018

(30) Foreign Application Priority Data

Jun. 29, 2016  (FR) ..................... 16 56067
Jun. 16, 2017  (FR) ..................... 17 55475

(51) Int. Cl.
| | |
|---|---|
| B62B 3/02 | (2006.01) |
| B62D 55/02 | (2006.01) |
| B62B 1/12 | (2006.01) |
| B62B 5/00 | (2006.01) |
| B62B 5/02 | (2006.01) |
| B62B 5/06 | (2006.01) |
| B62B 3/00 | (2006.01) |

(52) U.S. Cl.
CPC .................. *B62B 3/02* (2013.01); *B62B 1/12* (2013.01); *B62B 1/125* (2013.01); *B62B 5/0033* (2013.01); *B62B 5/02* (2013.01); *B62B 5/026* (2013.01); *B62D 55/02* (2013.01); *B62B 3/008* (2013.01); *B62B 5/0046* (2013.01); *B62B 5/065* (2013.01); *B62B 2206/003* (2013.01); *B62B 2206/006* (2013.01); *B62B 2301/256* (2013.01)

(58) Field of Classification Search
CPC ....... B62B 5/02; B62B 5/0033; B62B 5/0046; B62B 5/026; B62B 1/12; B62D 55/02
See application file for complete search history.

(56) References Cited

U.S. PATENT DOCUMENTS

| | | | | |
|---|---|---|---|---|
| 2,917,120 A | * | 12/1959 | Gates | ..................... B62B 5/02 |
| | | | | 180/9.36 |
| 3,276,531 A | * | 10/1966 | Hale | ..................... A61G 5/061 |
| | | | | 180/6.5 |
| 3,362,496 A | * | 1/1968 | Landry | ..................... B62B 5/02 |
| | | | | 180/9.22 |

(Continued)

FOREIGN PATENT DOCUMENTS

| | | |
|---|---|---|
| CA | 2 705 536 A1 | 11/2011 |
| DE | 298 80 021 U1 | 3/2000 |

(Continued)

*Primary Examiner* — Kevin Hurley
(74) *Attorney, Agent, or Firm* — Renner Kenner Greive Bobak Taylor and Weber

(57) ABSTRACT

Truck-type handling truck with a chassis and a back (40), and a low section, a nose plate attachment (41) and two wheels (71). The truck has a motor unit (60) mounted to the chassis (10) and an electric motor (61) connected to a differential transmission (62) with two lateral output shafts (621) and two track modules (50) each connected to a shaft (531) of the motor unit and mounted to swivel about this shaft independently between a position aligned with the chassis and a deployed position.

16 Claims, 19 Drawing Sheets

(56) References Cited

U.S. PATENT DOCUMENTS

| | | | | |
|---|---|---|---|---|
| 3,450,219 A | * | 6/1969 | Fleming | B62B 5/026 180/8.2 |
| 3,515,401 A | * | 6/1970 | Gross | B62B 5/026 180/8.2 |
| 3,876,022 A | * | 4/1975 | Ikarimoto | B62B 5/02 180/9.22 |
| 4,033,421 A | * | 7/1977 | Ikarimoto | B62B 5/02 180/8.2 |
| 4,062,418 A | * | 12/1977 | Misawa | B60P 7/0892 180/8.2 |
| 4,290,618 A | * | 9/1981 | Morton | B62B 5/02 180/9.22 |
| 4,432,426 A | * | 2/1984 | Misawa | A61G 5/061 180/8.2 |
| 7,597,522 B2 | * | 10/2009 | Borntrager | B66F 9/065 180/19.1 |
| 7,988,157 B2 | * | 8/2011 | Rembos | A61G 5/02 180/9 |
| 8,439,371 B1 | | 5/2013 | Vazquez | |
| 2006/0191724 A1 | * | 8/2006 | Mairose | B62B 5/02 180/8.2 |
| 2013/0274973 A1 | * | 10/2013 | Kamara | B62B 5/026 701/22 |

FOREIGN PATENT DOCUMENTS

| | | |
|---|---|---|
| EP | 2 284 061 A1 | 2/2011 |
| EP | 3 028 924 A1 | 6/2016 |
| FR | 2 844 496 A1 | 3/2004 |
| GB | 1 524 390 A | 9/1978 |

* cited by examiner

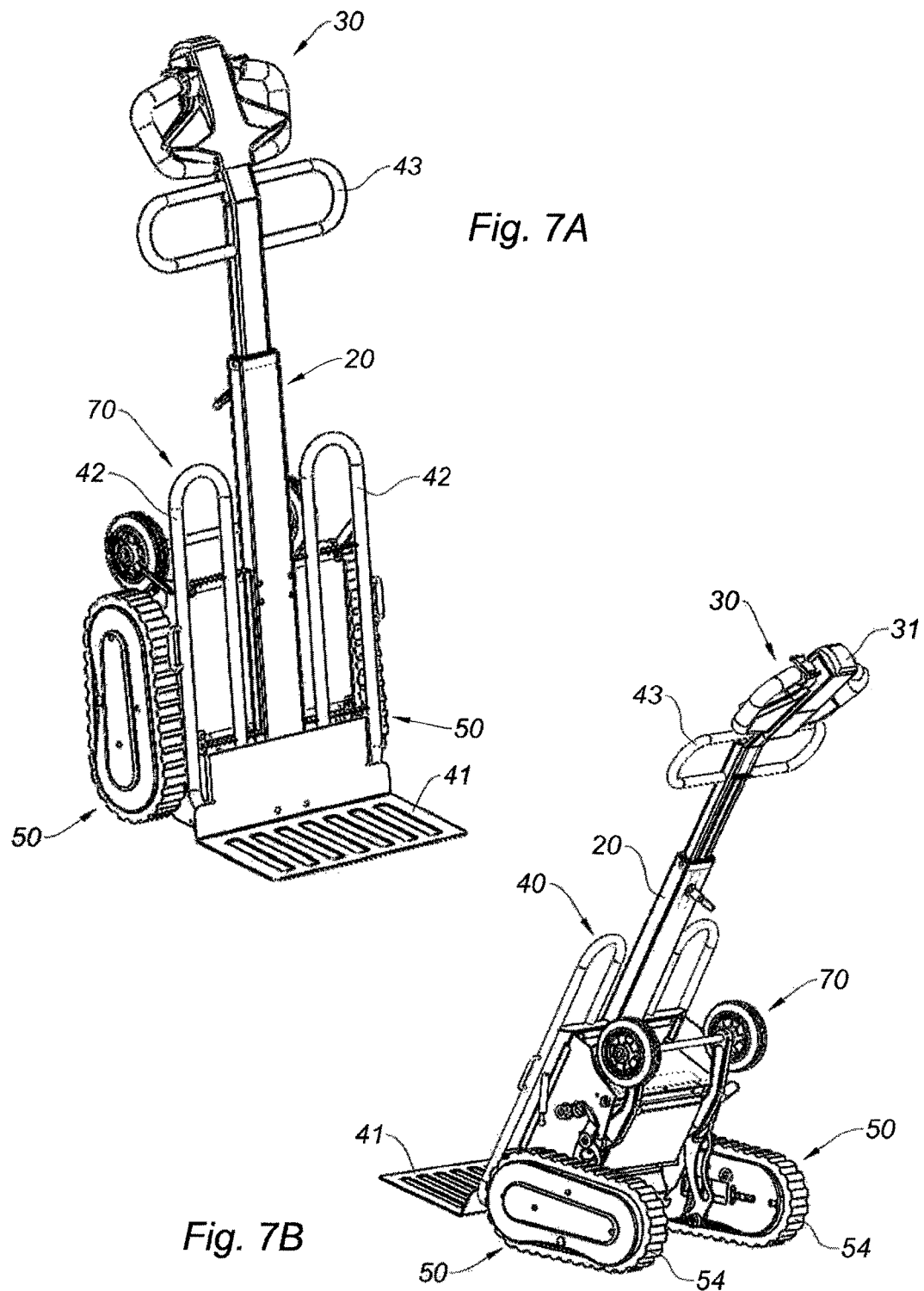

MOTORIZED HANDLING TRUCK

DISCLOSURE OF THE INVENTION

This invention refers to a truck-type handling truck with a chassis and a back, at the bottom a nose plate attachment and two wheels,

STATE OF THE TECHNIQUE

There are many known types of handling trucks, especially of the hand truck type, that is, a stretcher one end of which has two wheels and the other comprises grips with which the truck is guided in a position, generally raised to a relatively high position as opposed to a wheelbarrow which has an almost horizontal transport position.

The structure of the truck, at the bottom, consists of a return or a nose plate which is slipped under the edge of the load to be picked up for transportation and then tilted back onto the bearing surface formed by the leading edge of the stretcher above the nose plate.

The load is transported in this way, generally by pushing it in front of you.

However, a truck cannot cross irregular obstacles, for instance irregular or loose ground, and in particular cannot pass over one or several steps.

Of course, there are trucks designed to climb stairs and whose two wheels are each replaced by a combination of three wheels placed at the apex points of a triangle so that the truck running up against the step can be tilted back to raise the first pair of wheels so that they pass over the step, then tilting back the stretcher with the load, to pass the two highest wheels of this double triplet of wheels over the nose of the step to run on top of it, and repeat this movement of tipping back the two pairs of wheels about the nose of the step.

This truck is obviously of some interest but its ease of use is not so evident. Indeed, because the wheels of the two triplets of wheels are not locked in a direction of travel, it is difficult to get over the nose of the step because under the effect of being pushed forward, the truck tends to cause the wheels of these triplets to back up, meaning that the truck has to be pushed even harder.

In general, at present, there are no satisfactory solutions for moving a load on a truck over irregular ground, such as an aisle with gravel or a packed dirt track, or more generally, an irregular rolling surface with obstacles to various degrees of relief, a sidewalk curb, etc.

PURPOSE OF INVENTION

The purpose of this invention is to develop a handling truck of the hand truck type, capable of easily passing obstacles or moving around on an irregular surface or climbing steps without requiring great exertion from the truck driver.

OUTLINE AND ADVANTAGES OF INVENTION

Accordingly, the purpose of the invention is a handling track of the hand truck type characterized in that it comprises a motor unit mounted to the chassis and an electric motor connected to a differential transmission with two lateral output driveshafts, two track modules, each connected to one shaft of the motor unit and mounted to swivel about this shaft independently between a position aligned with the chassis and a deployed position for moving around.

The truck according to the invention is particularly compact because the two track modules offer a large bearing surface area when the two modules are in the deployed movement position, while being of a particularly compact shape and a reduced width, almost equivalent to a conventional truck. However, because the bearing surface of the two track modules is sizable, not only does the handling truck circulate easily because the two modules are motorized, but it also operates more regularly because of its larger floor bearing surface area, observing fleeting irregularities such as an obstacle in relief on the traveling surface. The operation of the truck is greatly facilitated by the differential transmission whose two output shafts are the driveshafts of the two track modules. In this way, the tracks can run at different speeds on curves without there being any skidding, that is a loss of adhesion, and excessive wear of the tracks. The truck can even turn on the spot because one track can advance and the other can back up, thanks to the differential. The track is also capable of moving over the nose of the steps in a staircase, even if the staircase is curved, because the tracks can follow the line without needing to slide with respect to one another, thanks to the differential. This makes it easy to travel downstairs with a load in front of you, or to go upstairs in the same position. This is a particularly advantageous situation on narrow stairs with a tight curve and no intermediate landing because the room for maneuvering is particularly tight. While a stairclimbing truck needs to be pulled, because pushing it will not allow the steps to be climbed, in the case of a truck according to the invention, the driver advantageously stays behind the truck because the modules pull the truck, driving it up the stairs.

This is also true for moving the truck over any surface other than stairs, because the truck is pulled by the motorized tracks in front of the driver. There is no need for him to push the truck but simply hold the grips to stabilize the truck if necessary, and above all to direct it.

The truck according to the invention is particularly advantageous for transporting bulky loads, such as household appliances when such devices need to be replaced. Accordingly, to transport a load such as a washing machine or refrigerator, it is simply a matter of sliding the nose plate under the load then tilting the truck back slightly so that the nose plate is engaged under the load allowing it to be extracted in reverse thanks to the track modules, from a nook when the installation is built in, such as encountered in a fitted kitchen. Then, once the load is clear, it is pulled back against the back for easy transportation through the premises, going down steps or even a staircase, loading into the transport vehicle, then operating in the same way with the replacement appliance.

A truck like this is also particularly advantageous for transporting a load on a construction site where the access paths are generally irregular or difficult for a regular truck or wheelbarrow. In addition, the load can be taken to its destination, even if it means going upstairs.

An advantage in the construction of the truck is that the track module has a body mounted to swivel about the transmission driveshaft bearing the drive wheel of the module with the module having a second free wheel whose axis is parallel to that of the drive wheel and over which the track passes, as well as a locking mechanism connecting the body of the module to the chassis to block the two positions of each module with respect to the chassis.

According to another advantageous property, the module has a drive wheel and a free wheel, and an intermediate support set back with respect to the lower tangent to the two wheels so that when the track passes over anything standing proud, such as a stair nose, the track is held in the interval between the two wheels while being able to curve inward slightly to better envelope the obstacle to be passed (such as a stair nose).

According to another advantageous characteristic, the module has a track the lower face of which has a guide rib in the two wheels of the module body, and an intermediate bearing each provided with a guide groove receiving the rib of the track. In this way, the track is provided with accurate transverse guidance on the drive wheel, the free wheel and the roller-shaped bearing so that transversal forces applied to the track do not cause it to come off.

According to another advantageous characteristic, the truck includes a running element consisting of a pair of wheels fitted to a shaft supported by two arms each connected to a pivot on the chassis, this pair of wheels moving between a stable retracted position above the track modules and a lowered stable running position under the tracks with the wheels protruding beyond their contour to roll on the ground without the tracks touching it.

According to another characteristic, the track module has a body mounted to swivel about the drive shaft bearing the drive wheel of the module, the module having a second free wheel on an axis parallel to that of the drive wheel and over which the track passes, with a locking mechanism connecting the body of the module to the chassis, this locking device consisting of an electric actuator for adjusting the position of the module with respect to the chassis while the actuators of the two modules move synchronously.

This locking device allowing the tilting of the chassis with the load to be inclined with respect to the supporting polygon formed by the two track modules facilitates the maneuvering of the truck and reduces the forces required of the operator to hold the truck, driving it, by pushing or pulling.

This maneuver is then particularly simple because the operator adjusts the tilting angle according to the forces he feels in gripping the handle of the truck.

To set the tilting angle, the operator simply needs to control the movement of the actuators. This movement is synchronous so that the angle formed by each of the modules with the chassis is the same.

The electric actuator allows continuous movement to facilitate the adjustment of the tilting angle.

According to another advantageous characteristic, the chassis has a telescopic handle the fixed part of which, integral with the chassis, is in line with its geometrical axis while the telescopic part has a guide and maneuvering grip at the end. This makes it possible to adjust the handle, for instance, to the size or methods to which the operator is accustomed, and also to retract the handle to reduce the overall size of the truck in the storage position.

According to another characteristic, the grip is arc-shaped, protruding on either side of the end of the handle to form to lever arms which can be used for stabilizing the operation of the truck.

According to another characteristic, under the grip the handle has a top support bearing on the telescopic part, completing the back and making it easier to stabilize a high standing load, for instance a refrigerator. This top support can also be used for securing attachments, straps or bungee cords.

According to another characteristic, the truck has a retracting support at the base of the chassis comprising a mobile assembled foot, sliding up by an actuator, this support being housed in the fixed part of the handle in particular. This retracting safe is a particularly advantageous safety device to prevent the truck from tipping over in the event of a wrong maneuver or an error because of the operator being inattentive, or more general, of an incident occurring during the maneuvering.

This retracting support is particularly simple to operate and integrate into the truck. It is controlled from the grip.

According to another advantageous characteristic, the end of the telescopic part of the handle is at an angle with respect to the supporting plane formed by the telescopic handle and the back, so as to enter beneath this plane from the other side of the part receiving the load, providing a practical way of holding the grip, even if the transported load is relatively high and pressed closely against the surface of the back.

According to another characteristic, the back consists of the fixed part of the handle and two longitudinal arcs on either side of the fixed part of the handle This is a simple means of constructing the back, being light and nevertheless offering a large surface area to hold the load firmly on the truck.

According to another advantageous characteristic, the tracks of each module have transversal teeth designed to catch on the obstacles to be passed, in particular step noses.

According to another characteristic, the truck has an auxiliary module comprising at least a triplet of wheels supported by an arm connected to the chassis and by an electric actuator to swivel between a retracted position and a deployed position extending down from the two track modules while assuming a central position symmetrical to the plane of symmetry of the truck.

The auxiliary module is a particularly advantageous item for transporting heavy loads on the truck, when being pushed, to ascend or descend steps.

The auxiliary module facilitates maneuvering by the operator because he does not need to support the chassis in the tilted position. In addition, passing steps in the tilted position adds to the safety of the solution because the center of gravity of the load, generally heavy and bulky, is set very low. The triplet is maneuvered automatically in its swiveling by the thrust of the track modules in the ascending direction or by retention by the braking of the track modules in the descending direction.

According to another advantageous characteristic, the truck has a rolling module consisting of a triplet of wheels supported by a support forming a three-arm star at equal angles to form an equilateral triangle, the assembly being mounted to pivot freely about the shaft passing through the center of the support with a length of the track passing over the three wheels.

According to another advantageous characteristic, the auxiliary module consisting of the triplets of wheels and the wheeled module having a track length have a support mounted by a swiveling shaft in an inverted U shape bracket, connected with the arm in order to swivel.

According to one variant, the auxiliary module is connected to the truck chassis in an easily removable way.

In general, the truck according to the invention is simple and economic to manufacture. The various components of the truck, if necessary, are easily replaced, such as the track modules or the electric equipment or battery. All these components are highly accessible. They are all located at the bottom of the truck, greatly facilitating the process of maintaining the truck stable in the standing position or in near standing position which is also the position for moving the truck over a plane surface, for instance horizontal or slightly inclined.

The track according to the invention is for general purpose use to transport many types of loads under difficult transport conditions, with differential levels or over an irregular rolling surface.

ILLUSTRATIONS

This invention is described in greater detail by reference to an embodiment of a truck of the hand truck type, according to the invention, as shown in the attached illustrations in which.

Figure 3:
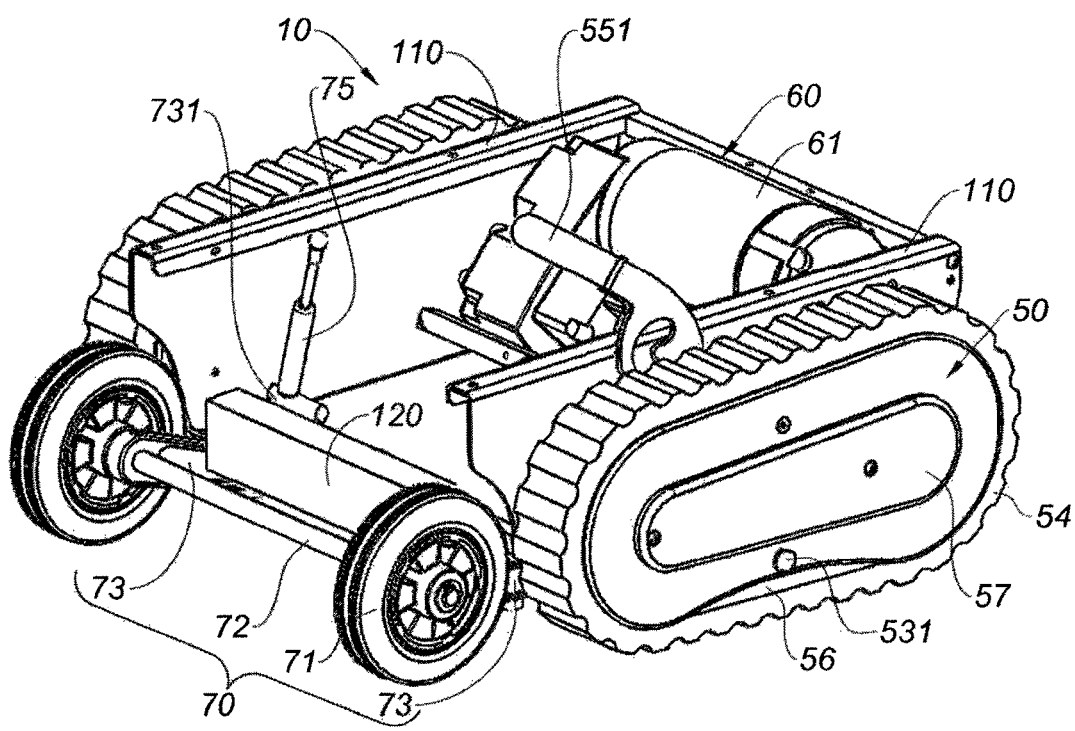
FIG. 3 is a perspective view of the chassis showing a track module.
Figure 4A:
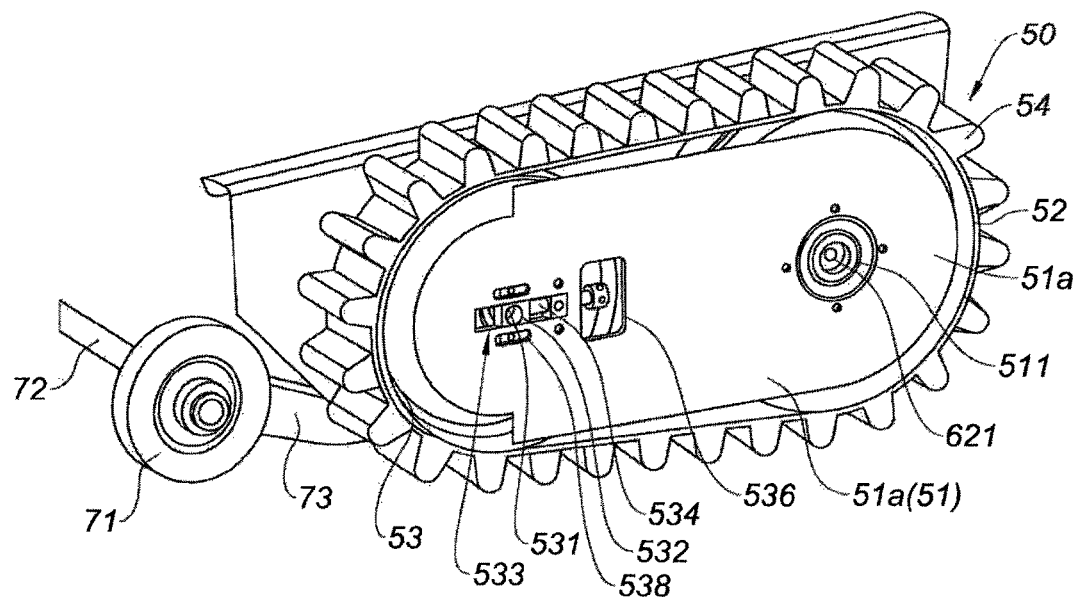
Figure 4B:
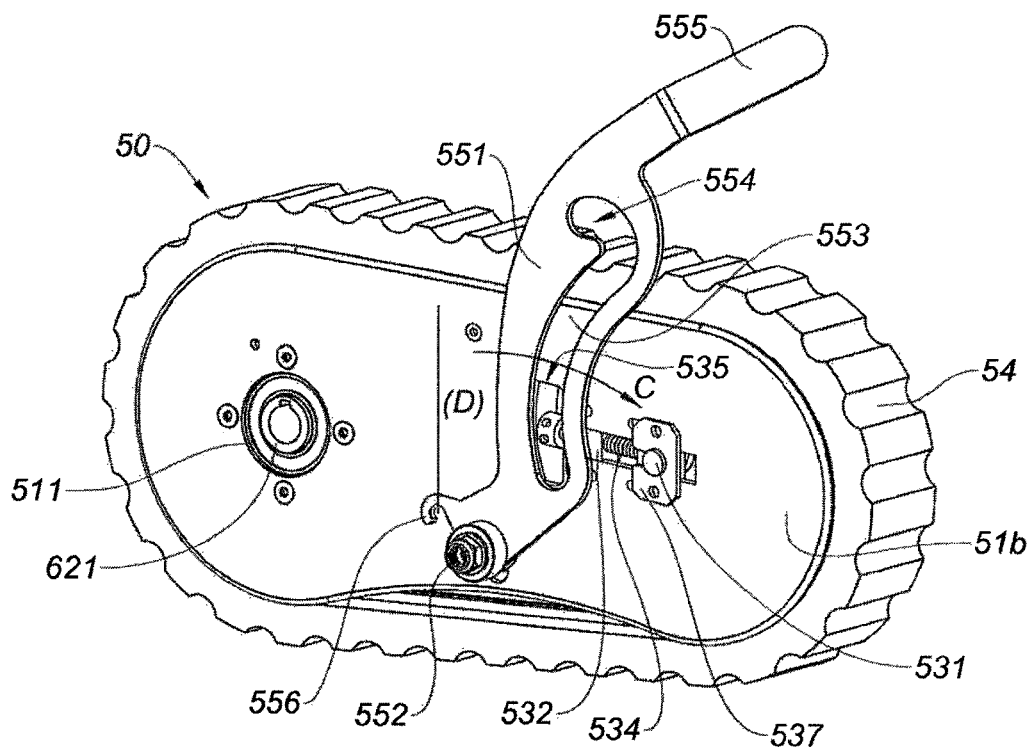
Figure 4C:
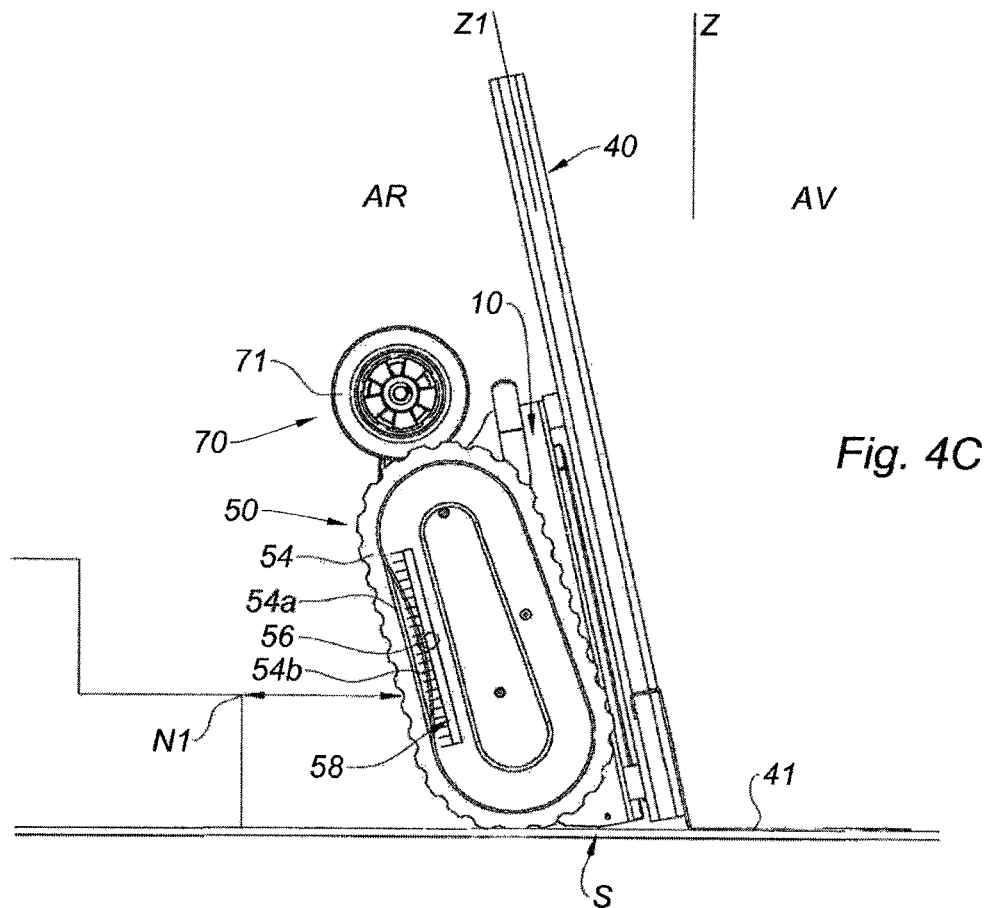
Figure 5:
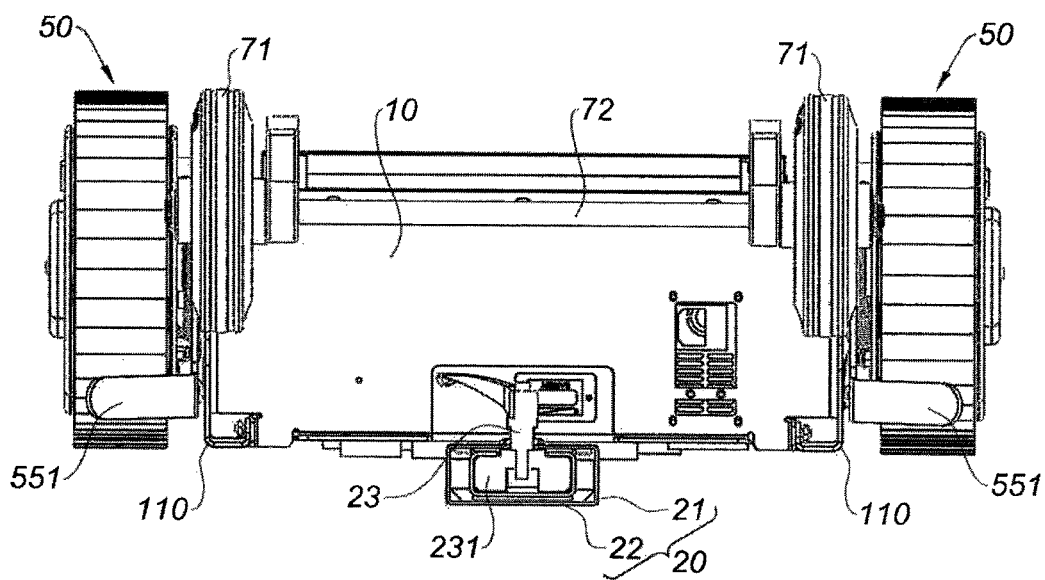
Figure 6A:
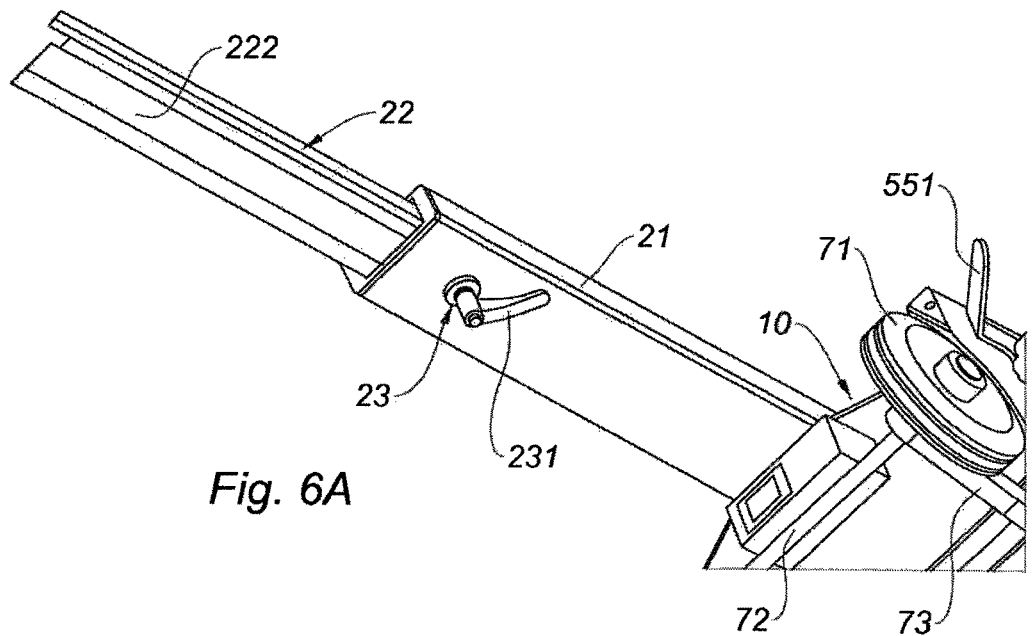
Figure 6B:
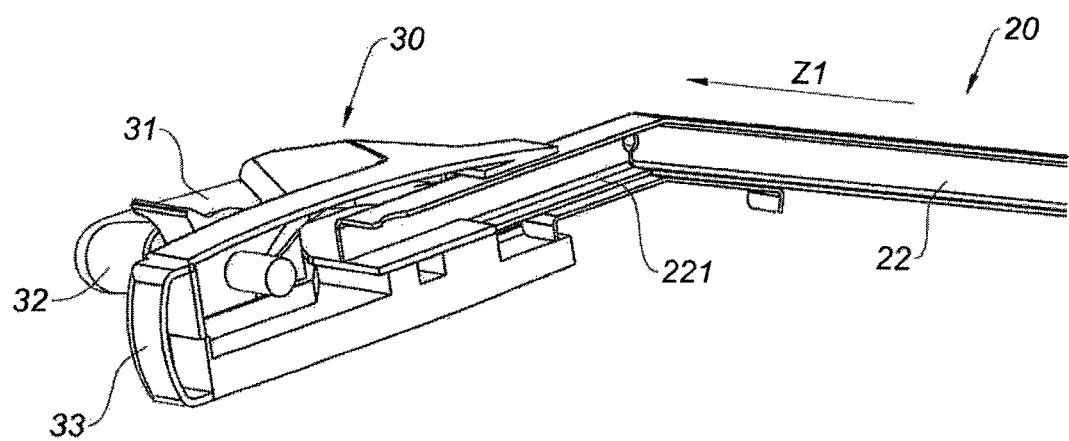
Figure 7C:
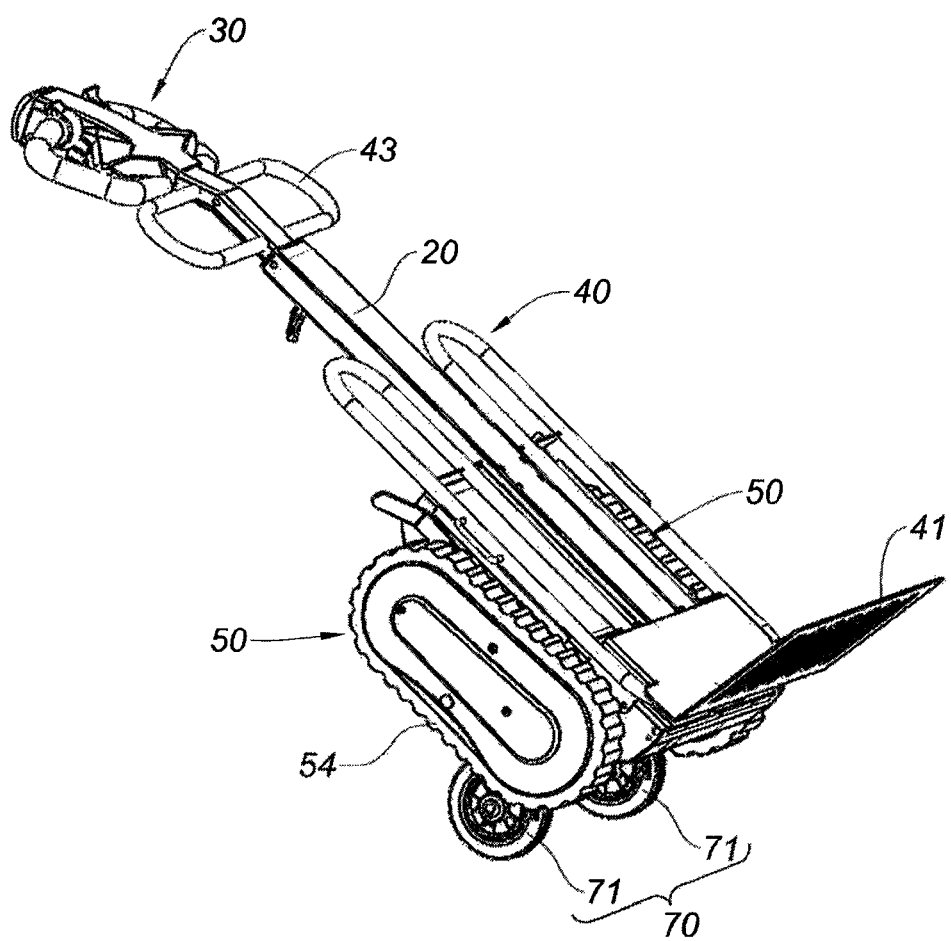
Figure 8A:
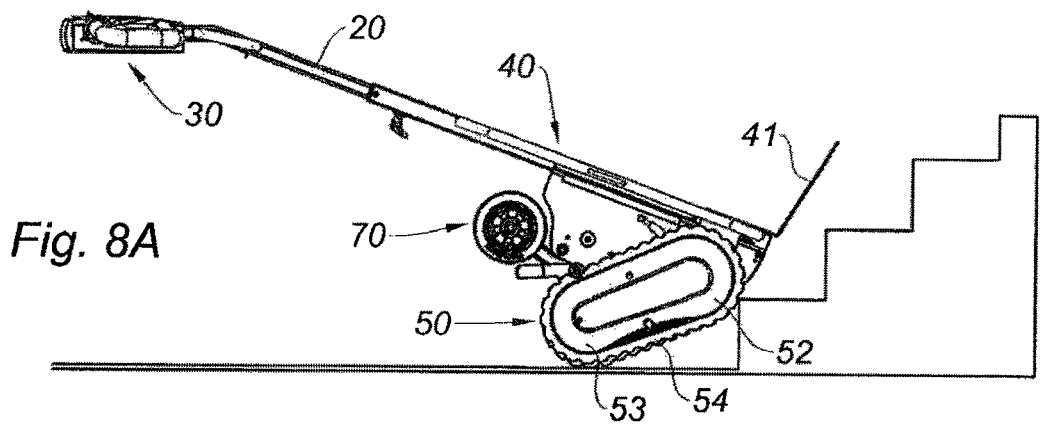
Figure 8B:
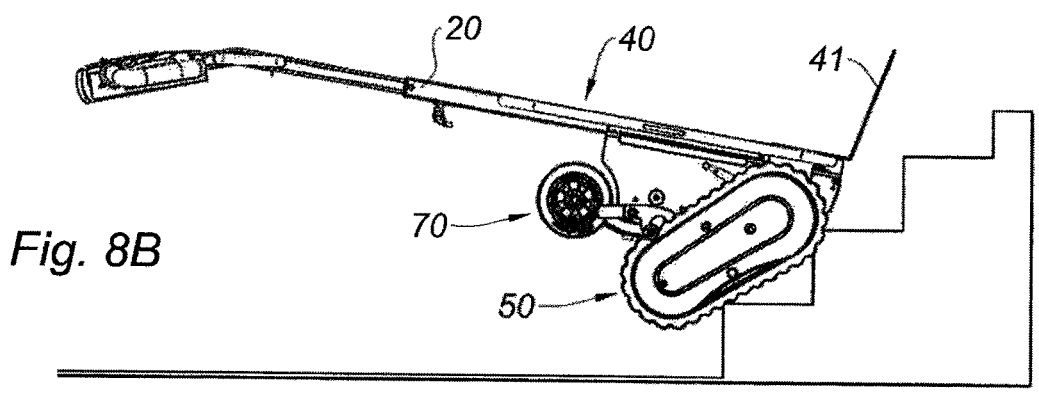
Figure 8C:
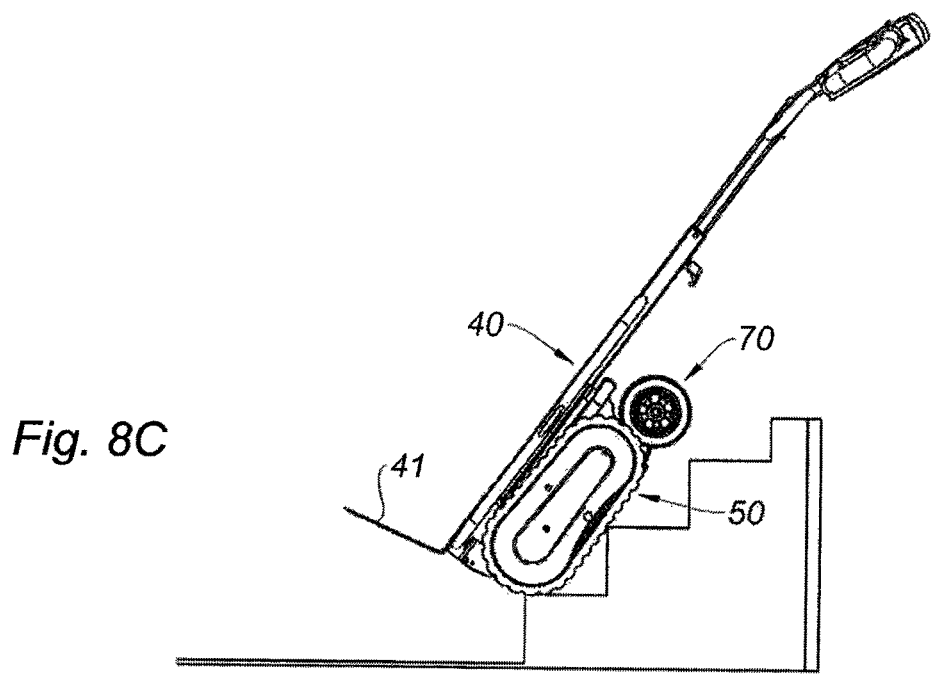
Figure 9:
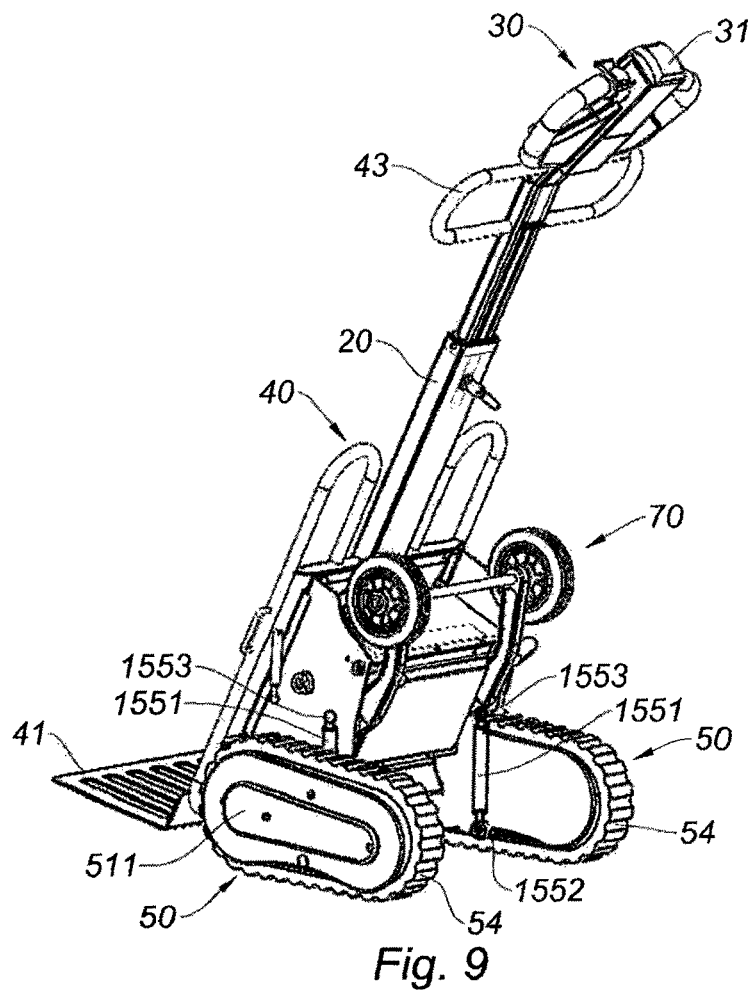

FIG. 4A offers a similar view to FIG. 3 but with the detail of the module on the outside, FIG. 4B is a view of the track module on the inside, FIG. 4C is a side view of the truck in the standing position, FIG. 5 is a top view of the truck toward the back, FIG. 6A is a detailed view of the handle, FIG. 6B is a central sectional view of the upper part of the handle, FIGS. 7A-7C our different perspective views of the truck in its various configurations:

FIG. 7A is a front perspective view of the truck in the standing position,

FIG. 7B is a rear view of the truck in the transport position with the tracks,

FIG. 7C is a front perspective view of the truck using its rolling component,

FIGS. 8A-8C are different views of the truck in a position to pass over steps with the load not represented on the truck, FIG. 8A shows the truck in the step climbing position with the operator at the back, FIG. 8B shows the truck passing over two step noses, FIG. 8C shows the truck in its descending movement in front of the operator, FIG. 9 is a perspective view of a second embodiment of the truck.

Figure 10:
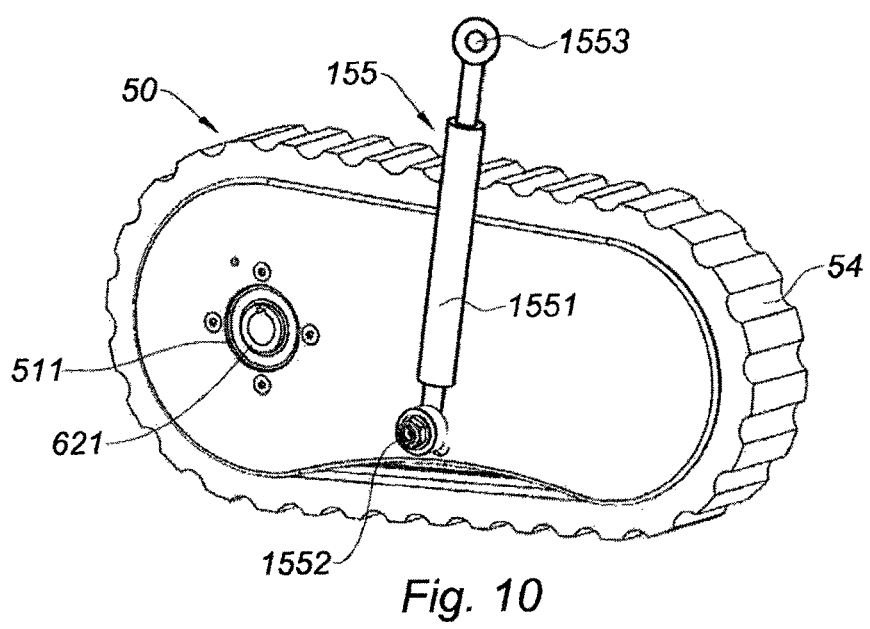
Figure 11:
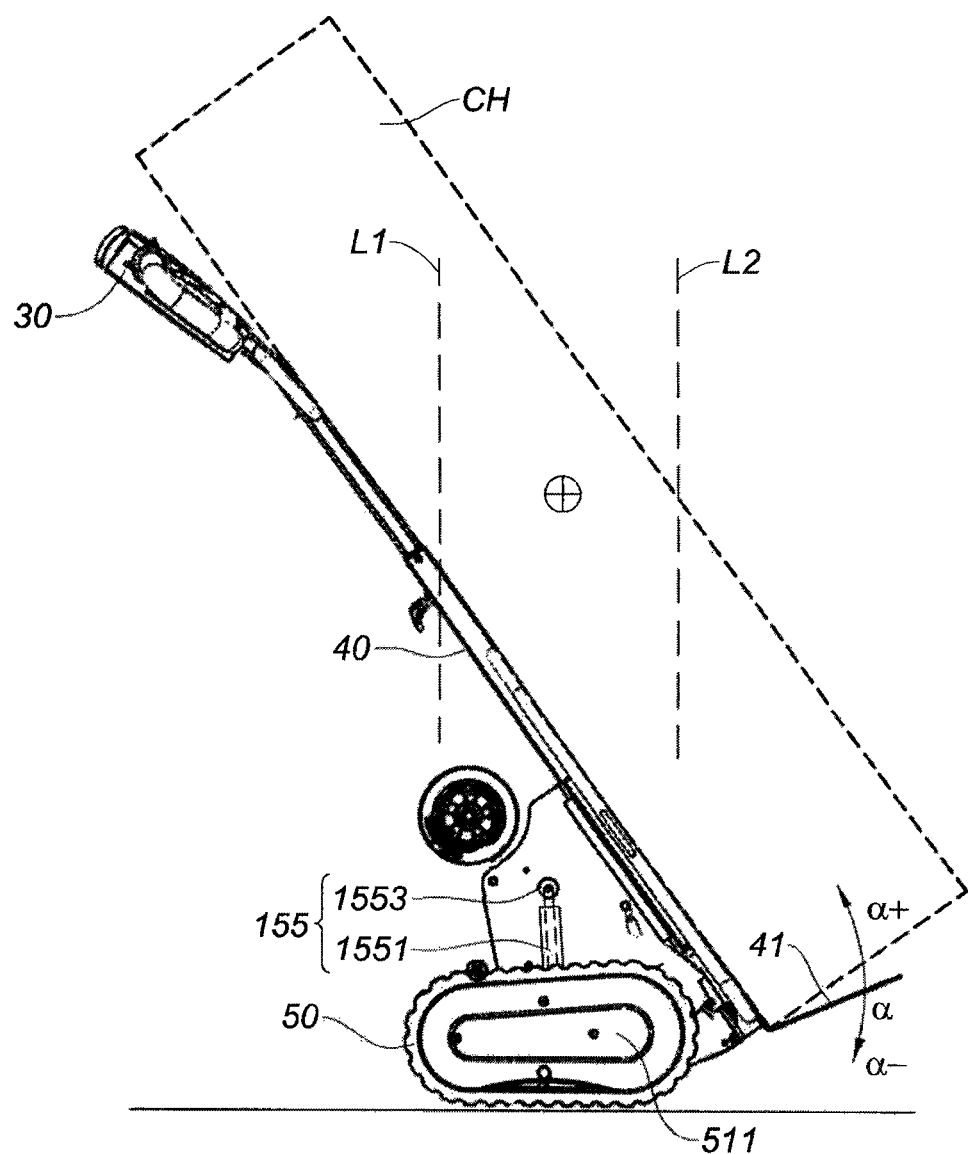
Figure 12:
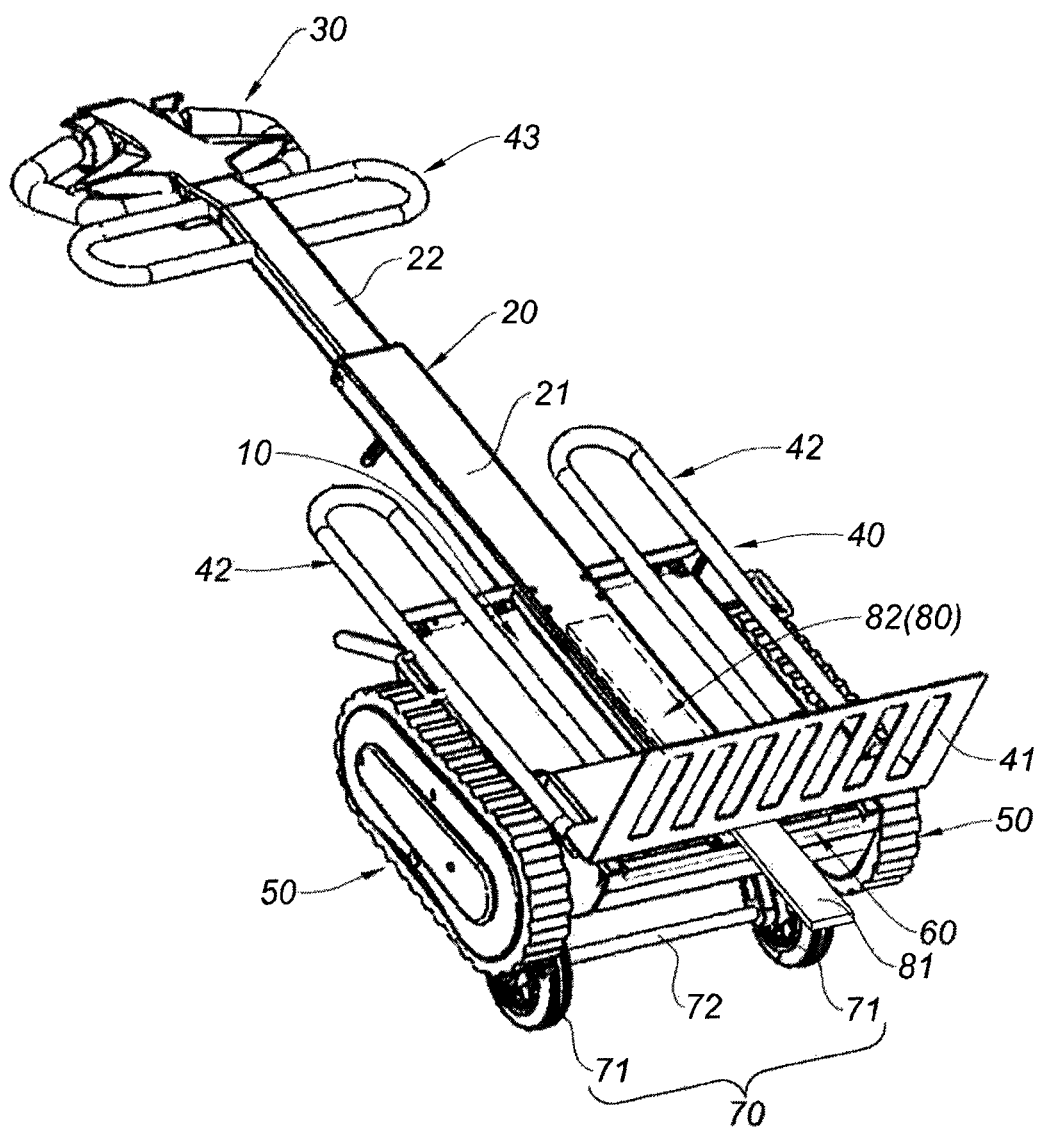
Figure 13:
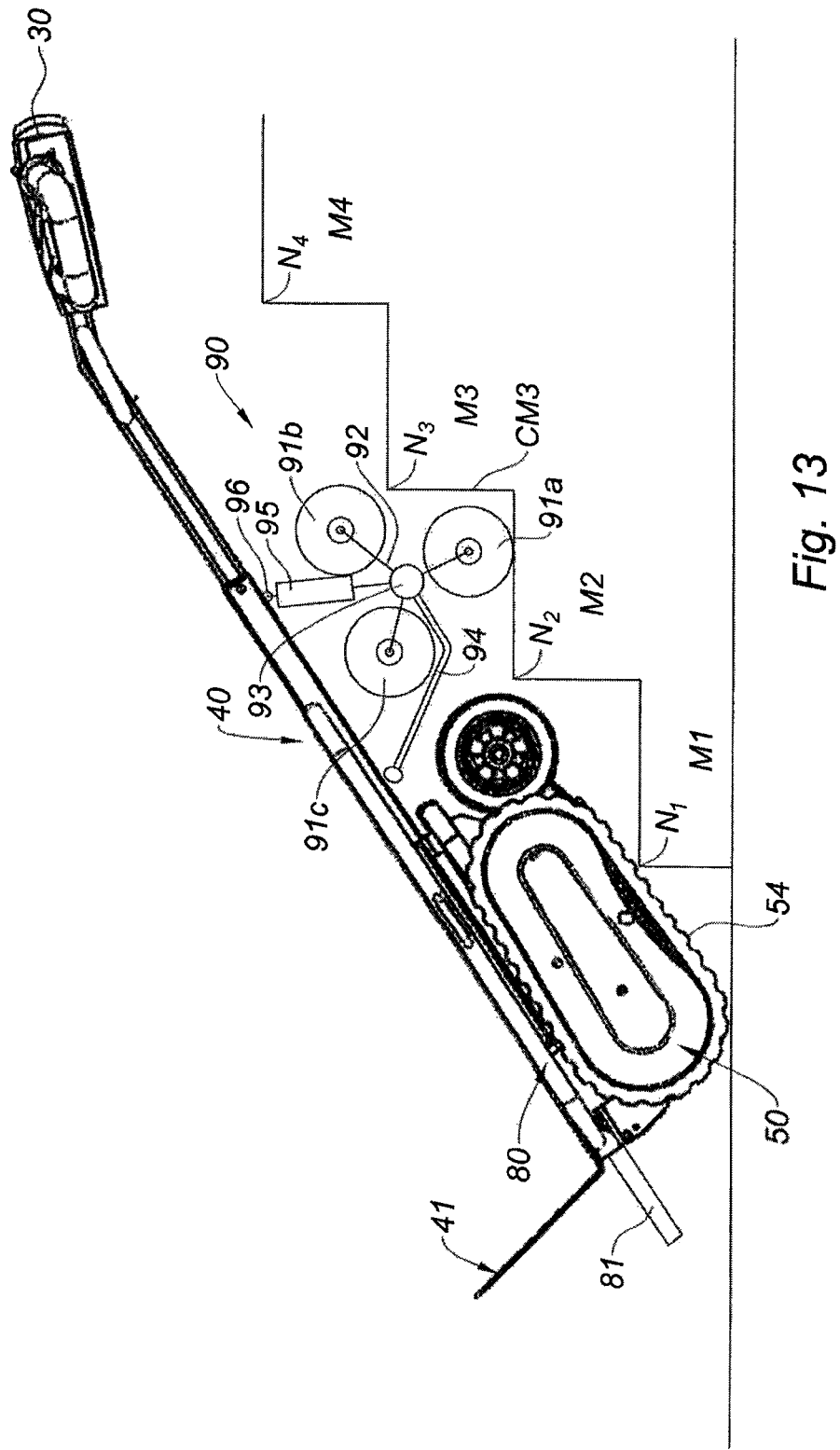
Figure 14:
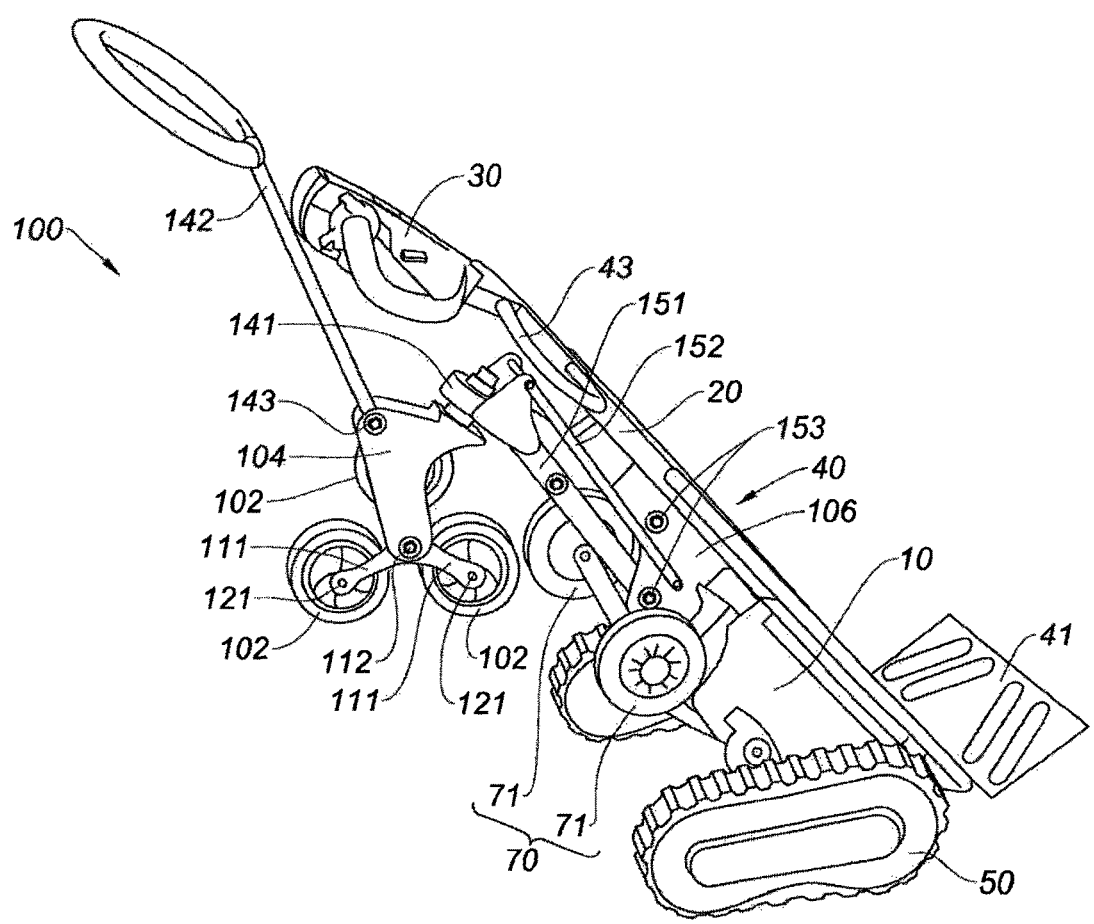
Figure 15:
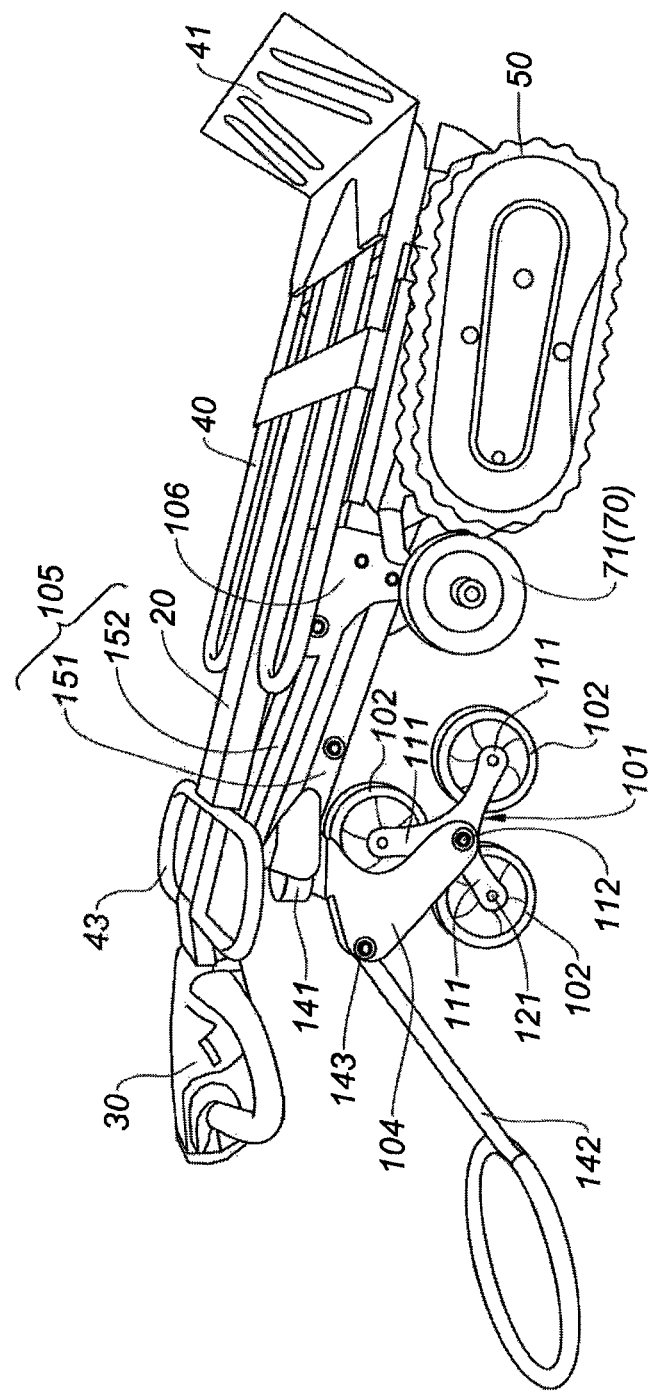
Figure 16:
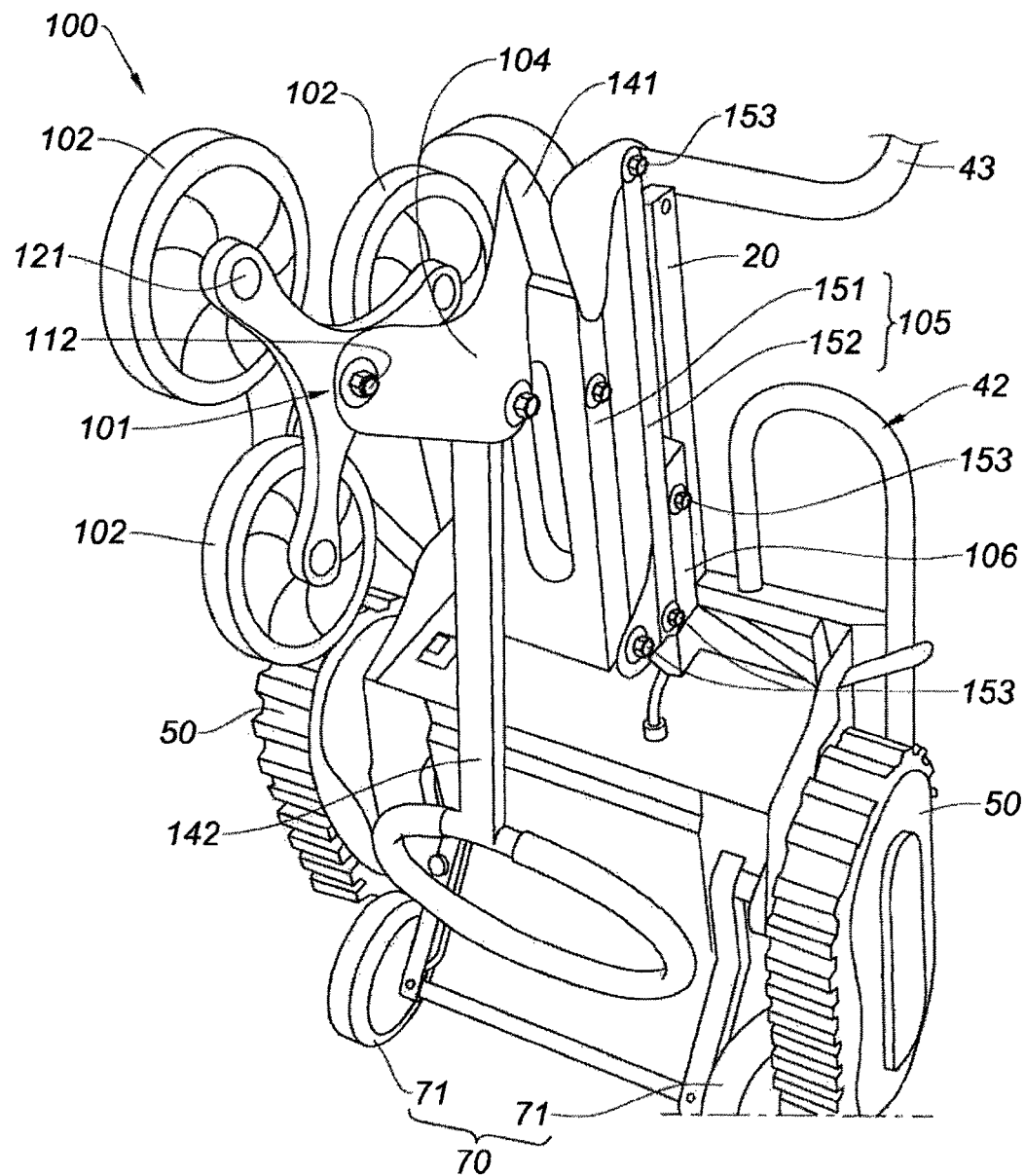
Figure 17:
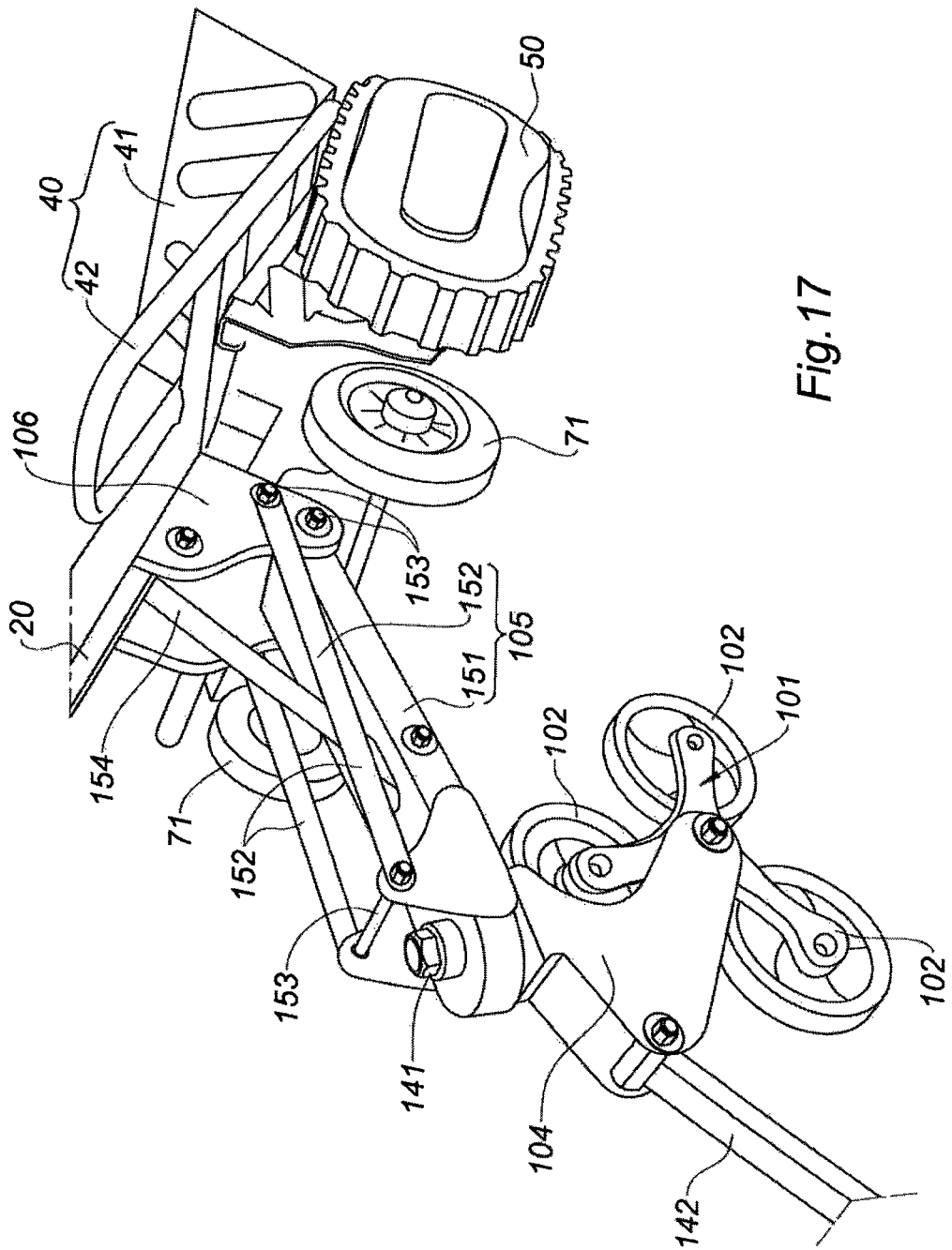
Figure 18:
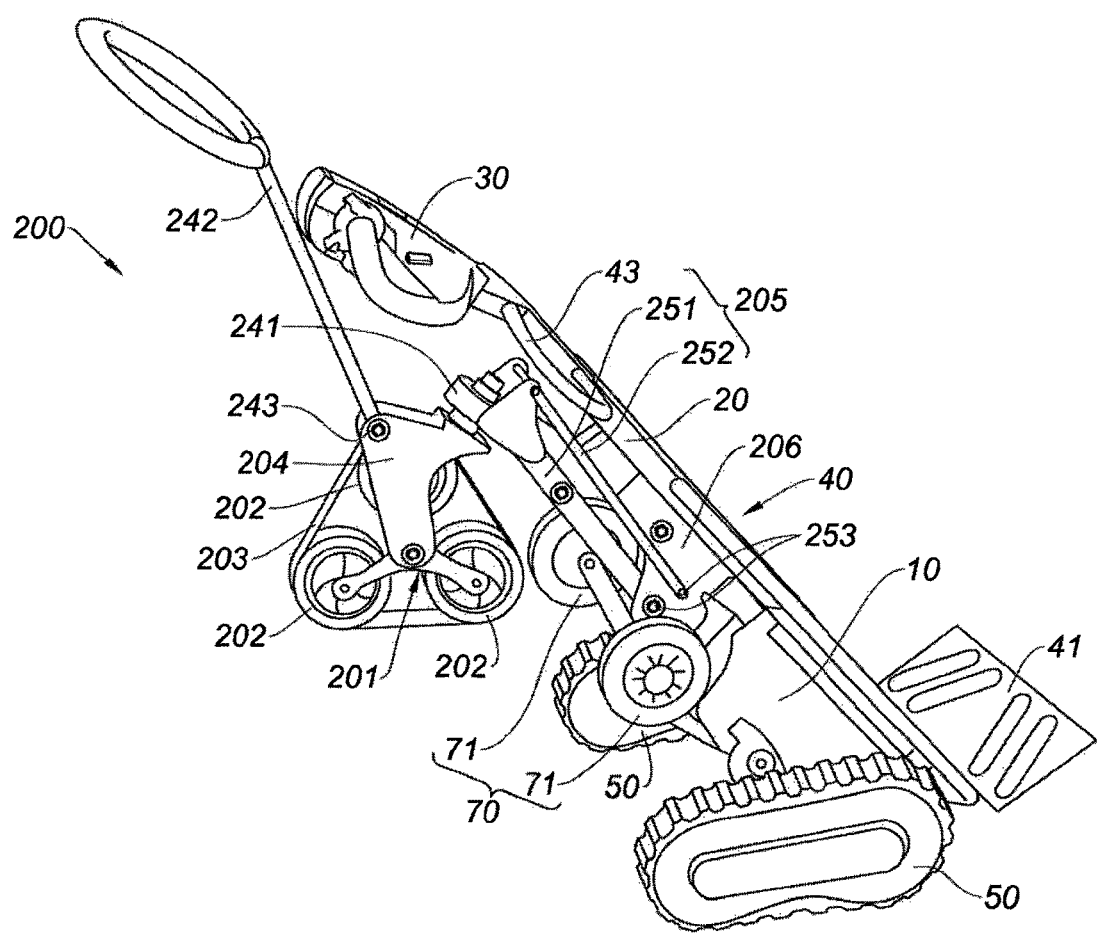
Figure 19:
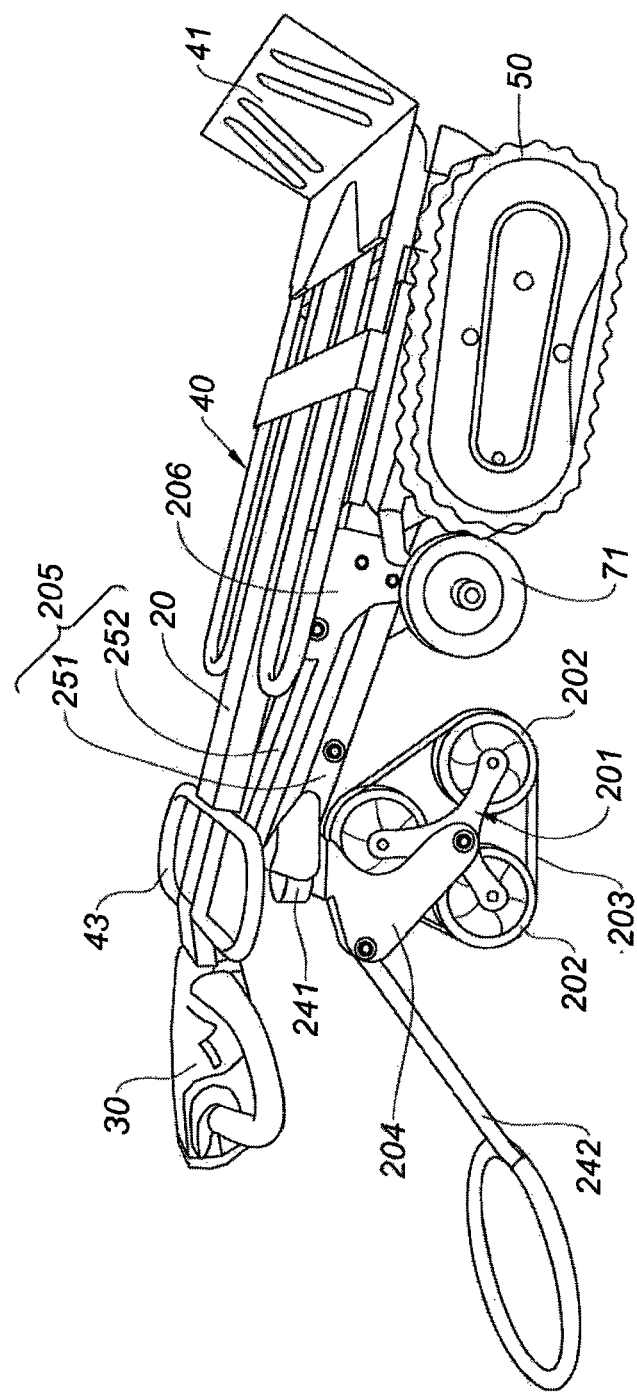
Figure 20:
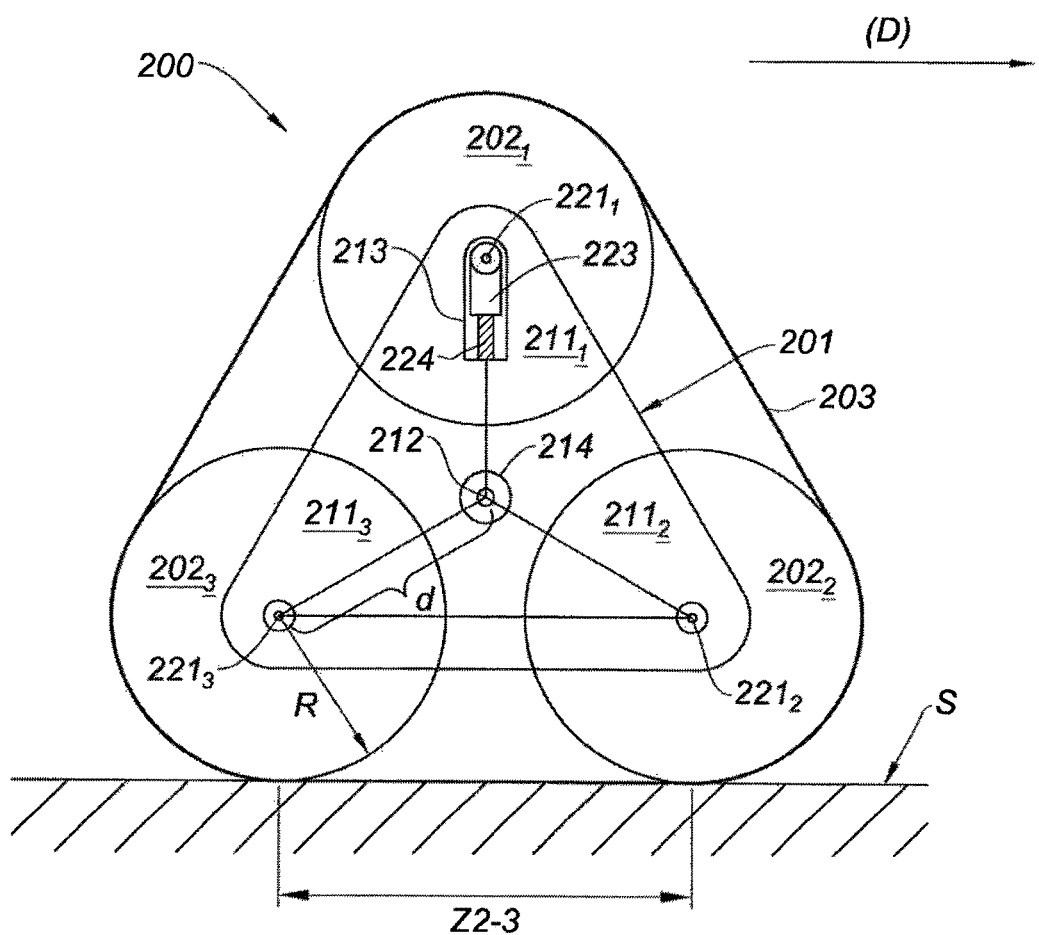

FIG. 10 is a perspective view of the inside of a track module,

FIG. 11 is a side view of the loaded truck showing the swiveling of the chassis with respect to the track modules in position to run over a flat surface, FIG. 12 is a perspective view of another embodiment of the truck, including a stop to avoid overturning, FIG. 13 is a side view of another embodiment of the truck, equipped with an auxiliary module, FIG. 14 is a perspective view of another embodiment of the truck equipped with an auxiliary running module with the truck shown pressing against the two track modules, FIG. 15 shows the truck of FIG. 14 in the recumbent position, FIG. 16 is a detailed view of the rear part of the truck of FIG. 14, in the standing position, FIG. 17 is another perspective view of the detail of the auxiliary module of the truck from FIG. 14, with the truck pressing against the track modules and the auxiliary running module, FIG. 18 is a perspective view of another embodiment of the truck equipped with an auxiliary track module, shown in the standing position pressing against the two track modules, FIG. 19 is a view of the truck from FIG. 18 in the lowered position, bearing on its tracks and on its auxiliary track module, FIG. 20 is a schematic detailed view of the triplet of wheels provided with the track of the auxiliary module of FIG. 18.

DESCRIPTION OF AN EMBODIMENT OF THE INVENTION

Figure 1:
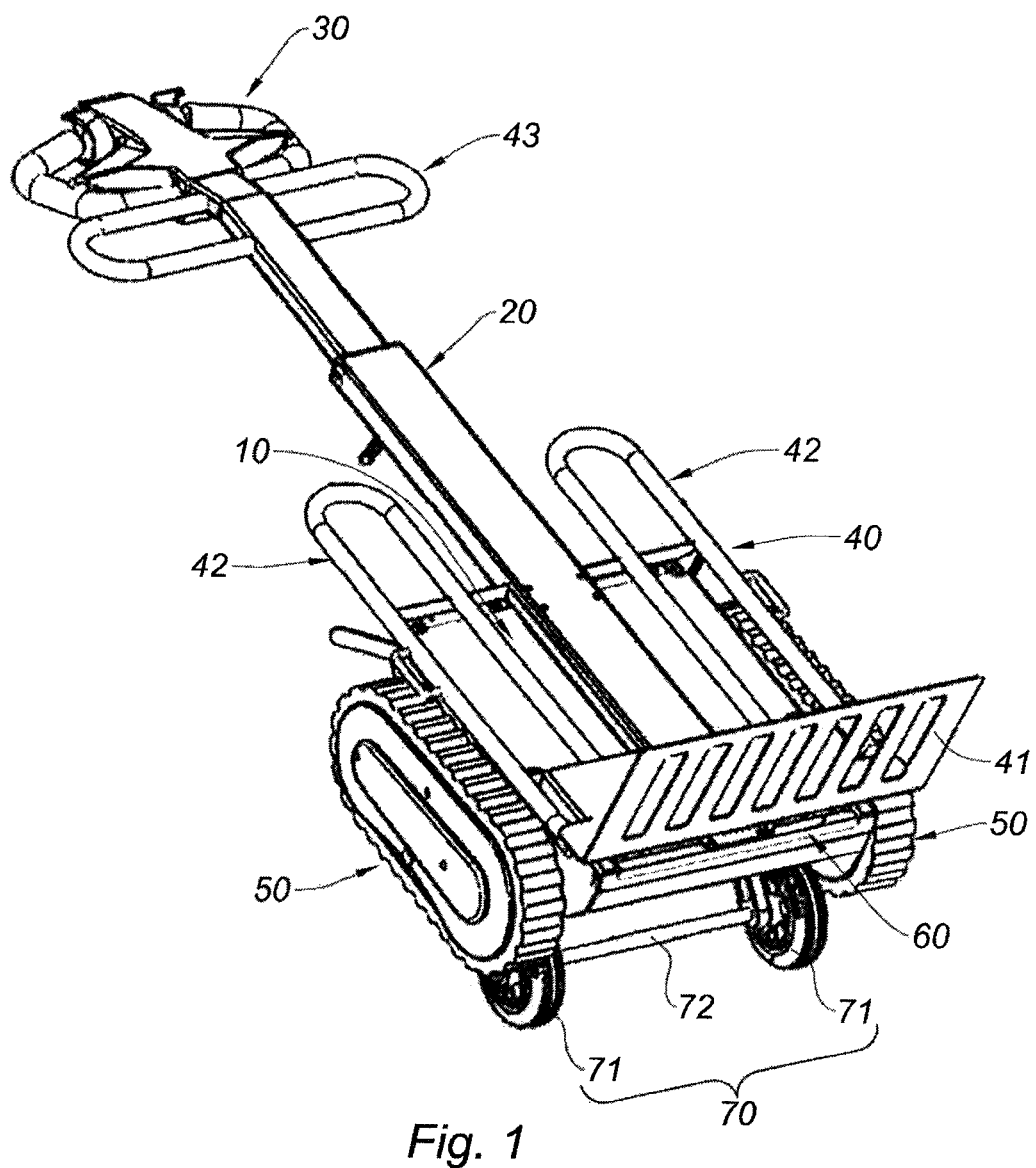
FIG. 1 is a perspective view of the truck.
Figure 2:
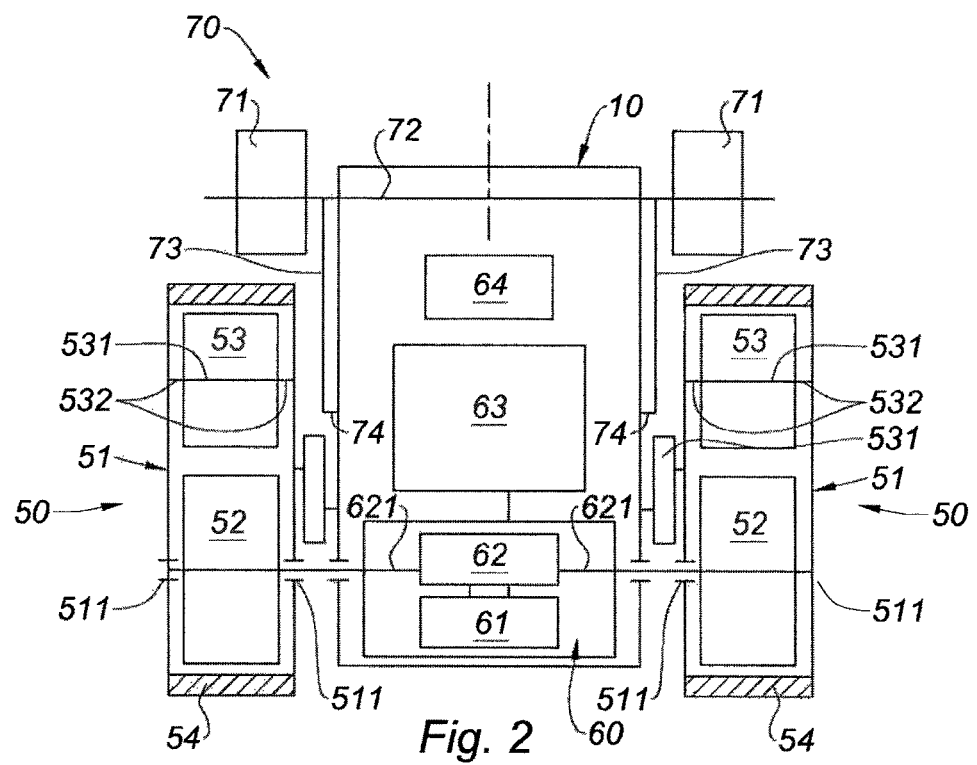
FIG. 2 is a diagram of the chassis and chassis equipment of the truck.

FIGS. 1 and 2 show an embodiment of a handling truck of the hand truck type comprising a chassis 10 with the various functional parts.

Chassis 10 is operated with a telescopic handle 20 ending in a grip 30 forming part of back 40 and having, at the bottom, a nose plate 41 designed to engage under the load to be transported, raise it then hold it pressed against back 40.

On the two sides, chassis 10 is flanked by a motorized track module 50 designed to roll over a regular or irregular surface and also to negotiate the steps of a staircase, to go up or down. Preferably, the overall width of the truck will be that of a hand truck so that it passes easily through an opening such as a door while the transported load may exceed this width.

As a complement to the track modules 50 driven by a motor unit 60, comprising an electric motor 61 and a differential transmission 62, connected to the two track modules 50, chassis 10 has rolling components 70 with a two-wheel shaft 71 connected by two arms 73 to the chassis, passing in the gap between the sides of the chassis 10 and each track module 50.

The rolling component 70 swivels between a stable retracted position and a stable deployed position as shown, serving as a means of rolling while protruding beyond the contour of the tracks to allow the truck to run without using the tracks and the motor.

The truck depicted in general in the FIGS. 1 and 2 will be described in greater detail below, more particularly as follows:
  chassis 10 by means of FIGS. 3, 4A,
  track module 50 by means of FIGS. 3, 4A, 4B et 4C,
  rolling component 70 by means of FIGS. 3, 4A,
  the telescopic handle by means of FIGS. 1, 5, 6A, 6B,
  the control grip by means of FIGS. 1, 6B, 7A,
  the various configurations of the truck will be shown in the general views of FIGS. 7A-7C, and
  specific operating situations will be described in FIGS. 8A-8C.

According to FIGS. 3, 4A, the chassis 10 is a structure, for instance machined and welded, consisting of two sides 110 of bent sheet-metal connected by cross braces 120; it houses the motor unit 60 and supports the track modules 50 and rolling component 70.

According to FIGS. 2, 3, 4A, the motor unit 60 is in a transversal position; it consists of an electric motor 61 powered through a control circuit 64 connected to the grip 30 from a battery of cells 63, for instance, of the Li-ion type. This battery is housed in the chassis 10.

The motor 61 is connected to the differential transmission (or put more simply to a differential 62) comprising a reducer and at the output a differential with two output shafts 621, each connected to one of track modules 50. The modules 50 are symmetrical and for this reason, the description will be confined to one of them, using the same references for both modules.

The track module 50 has a body 51 assembled to swivel freely on the bearings 511, on the output shaft 621 of the differential 62. The body 51 houses the drive wheel 52 integral with the output shaft 621 and supports a free wheel 53 mounted on a shaft 531. A track 54, preferably with transversal outside ribs 541, passes over the two wheels 52, 53 of the module. The inside surface of the track, being in contact with the two wheels, has a longitudinal rib in the shape of a V-belt and the two wheels 52, 53 have a peripheral groove matching this rib (in terms of shape and position) so as to retain the track 54 transversely to prevent it from coming off under the effect of the transversal forces to which the track can be exposed during the maneuvering of the truck.

The body 51 of the module consists of two oblong plates 51a, 51b, one 51a on the outside of the truck (FIG. 4A), and the other 51b on the inside of the truck (FIG. 4B); these two almost identical plates are mounted to the output shaft 621 of differential 62 through roller bearings 511. The two plates support shaft 531 of the free wheel 53 by a double sliding assembly each comprising a bearing 532 associated with each plate 51a, 51b, guided in a slide 533 and combined with a screw 534, fixed in the translation movement, whose head 535 is accessible through a window 536 in the plate 51a or 51b. Each end of shaft 531 is therefore supported by a bearing 532, adjustable by a separate screw 534. Only one of these two assemblies appears, together with its screw, both in FIG. 4A and FIG. 4B. The adjusted bearing 532 is locked by a pad 537 as shown in FIG. 4B; it is screwed into bearing five 32×2 screws passing through the slots 538 so as to lock the plate 51a,b by pinching it.

The shaft 531 of the free wheel 53 supported by the two bearings 532, each assembled to be adjustable on the body in a slide 533, offers the means of adjusting the tension applied to the track 54 and the parallelism of the free wheel 53 according to the access of the drive wheel 52 and to maintain the track 54 in line with the wheels 52, 53.

Preferably, the track 54 is shaped, thickness wise, by an interior part in contact with wheels 52, 53 allowing very little extension to resist the elongation forces affecting the track, and an outer part with cleats, very flexible, to extend on the passage over the wheels 52, 53, matching the shape of the obstacles, irregularities in the floor, step noses, for the adhesion or even the gripping of the track on the obstacles.

Module 50 also includes an intermediate support (FIG. 4B) for the track 54, between the drive wheel 52 and the free wheel 53. This inset support of the straight geometrical line, at a tangent under each wheel 52, 53, is formed by a roller 56 enabling the track 54 to depress slightly as it passes over a local obstacle, for instance the nose of a step, the curb of a sidewalk or a large stone, while maintaining substantial contact for the remainder of the track and the surface on which the track is bearing (the wheels 52, 53 of the module running over the track 54 which itself remains fixed with respect to the surface over which the module is traveling).

The crescent shaped surface left free between the straight line 54a of the rectilinear line of the track 54 and the concave shape 54b of the track 54 when it bears on the roller 56, passing an obstacle, is preferably closed by a retractable or deformable cover such as a broom or a flexible deformable belt of plastic or rubber, or a rigid strip, guided by slides or runners in its retraction.

The purpose of this cover is to prevent gravel or other small foreign matter from entering the module when the track runs on the flat over a gravel surface, or of other particles, which could pass through this crescent shaped gap.

It should be underscored that the plates 51a, 51b of the body 51 overlap the track slightly in order to close the body of the module from the outside.

The plates 51a, 51b are covered by a cover 57 which closes the interior of the module 50 at the base of the track 54.

FIG. 4B shows the interface of the module 50, turned towards the middle plane of the track and which is provided with a locking lever 551, mounted by a pivot 552, on the module 50.

The lever has a slide 553 receiving the sliding section carried by the chassis 10.

The slide 553 has a retaining notch 554 at the top, forming a support for the sliding section when the module 50 is in the deployed position.

The lever 551 is pulled back by a spring, not shown (direction D) hooked onto a peg 556 of lever 551 and chassis 10 to turn the lever in direction C and thus push the notch 534 onto the sliding section.[2]

The shaft 552 is also the shaft of bearing roller 56 for track 54.

As already indicated more generally, module 50, aligned on chassis 10 (FIGS. 4A, 4B), deploys to pivot about the shaft 631 of the drive wheel 52 and therefore with respect to chassis 10. To obtain this, it is necessary simply to press with the foot on module 50 at track 54 enclosing free wheel 53 so that the module swivels while the runner, not shown, supported by chassis 10, rises (relative movement) in curved slide 553 and finally nests into the retaining notch 554 because the spring tends to cause the lever 551 swivel in the direction of the arrow C. The module 50 is thus blocked with respect to the chassis 10. To unlock the module 50, simply push the lever 531 in the opposite direction using your foot (direction –C) to release the notch 554 in the slide so that module 50 can swivel in the opposite direction under the effect, for instance, of an air spring so that the module recovers its aligned position on chassis 10.

The movement of a module 50 is independent of that of the other module because the modules turn freely about their shaft 621 of the drive wheel 52 and the only visible sign is the swiveling of the free wheel 53 with respect to the track 54 because the drive wheel 52 remains fixed, integral with the output shaft 621 one which, obviously, does not turn.

FIG. 3 shows the outside of module 50 with a cover 57 over the bearing 532 of the free wheel 53 and its adjusting window 536 and the end of the shaft of drive wheel 52 and its bearing.

According to the diagram of FIG. 2 and the views of FIGS. 3, 4B, the electric motor 61 and its differential 62, part of the assembly of the modules on output shafts 621, are in the bottommost position, advantageous for the stability of the truck whose empty center of gravity is therefore placed very low.

The side view of the FIG. 4C shows the geometry of the truck in the standing position, balanced and empty, and under load (the load is not depicted). The floor surface S is assumed to be horizontal. The direction Z1 of the back is tilted towards the rear (REAR) as opposed to the front (FWD) which is the side of the load with respect to the vertical direction Z.

The nose plate 41 forms an angle of more than 90° with respect to the back 40, resulting in this inclination of direction Z1. Accordingly, the truck stands on the floor by means of its nose plate 41 and by the end of the track 54, on the drive wheel 52 side. The components (motor, transmission, battery) are organized in chassis 10 so that the center of gravity is as low as possible and falls within the lift polygon, that is, between the bearing point of the nose plate 51 and the bearing plate of track 54.

The tilted arrangement of the nose plate 41 allows the nose plate 41 to be slipped under a load (parcel, machine such as a washing machine, refrigerator) so that at this time, for this picking up (or pulling out that is the opposite) maneuver, the back 40 does not touch the load (corresponding to the vertical orientation Z), substantially facilitating the maneuver. In addition, the grip is clear of the load. After the load has been picked up, it is tilted backwards (REAR) against the back 40.

The FIG. 4C also shows on the left, two steps which can be tackled with the truck directed in this manner. The return line shows the place where the track 54 encounters the nose of step N1 which is located in the interval between the two contact zones of the track 54 and the two wheels 52, 53.

In this interval, the track 54 moves from its rectilinear line 54a to the concave line corresponding approximately to the contour of profile 54b and that is supported by bearing roller 56.

The FIG. 4C shows an example of a cover 58 over each crescent-shaped opening in the plates 51a, 51b of the body 51 as already described. Cover 58 is shown here as a broom.

The FIGS. 3, 4A, 4C show the rolling element 70 with its pair of wheels 71 mounted on a shaft 72 supported by two arms 73 connected to pivots 74 of the sides 110 of the chassis, in the interval left with each track module 50.

The arms 73 are connected to the chassis 10 by an air spring 75 stabilizing them in the travel end positions, thus creating a metastable point of passage so that the shaft 72 with the two wheels is always conducted towards one or the other of these travel end positions. This assembly also appears in the top view provided in the direction of the handle in FIG. 5.

The FIGS. 5, 6A, 6B show the structure of the telescopic handle 20 the fixed part 21 of which is a rectangular box a section tube attached to the chassis 10 and whose telescopic part 22, engaged in the fixed part, is also an open rectangular box section tube 21, sliding in the fixed tube 21, and locked with respect to this tube by being fastened by a screw 23 with a key 231 (FIG. 5, FIG. 6A).

The tube of the telescopic part 23 has a longitudinal opening 222 passing over the fastening screw 23 which has an internal shim 232 locking the telescopic tube 22 against the fixed tube 21.

FIG. 6B, a perspective view of the telescopic part 23, in a longitudinal section, shows its top end 221 forming an angle with respect to the direction Z1 of the fixed part 21 and the telescopic part 22 so that the grip 30 is under the back plane and allows the grip to be held, even if the object to be transported is pressed against back 40, and its height (length) exceeds the length of handle 20, adjusted, for instance, to suit the height of the truck operator.

As shown in FIG. 1, grip 30 is a double arc 31 protruding well beyond each side of the plane of symmetry to provide a sufficient leverage arm on each side, facilitating the maneuvering of the truck.

The control buttons 32 of the motor (forward, reverse, speed and stop) are supported by handle 20 so that they are doubled on each side, within reach of the fingers and thumbs of the operator.

The speed control knob is a way of adjusting the truck drive, for instance, to the difficulty of passing an obstacle, such as steps and/or to facilitate turning at low speed while traveling over a regular surface can be at the walking speed of the operator. In addition, on a down sloping surface, the speed control allows the loaded truck to be braked.

An emergency stop button 33 is fitted to the end of the handle so that, when it is pressed, the motor is turned off immediately.

The operating indicator lights, such as the battery charge level, may be fitted to the grip, or to the top of the chassis.

According to FIG. 1, the back 40 is a bearing surface formed in the middle, in its plane of symmetry, by the rectangular profiled face of the fixed part 21 of the handle 20. This surface area is transversely enlarged by two longitudinal and tubular arcs 42, made integral with chassis 10 and forming both a bearing surface and a means of attachment for the straps.

In order not to limit the overall size of the truck which must be kept small for its storage or for some maneuvers, the arcs 42 of the back do not protrude beyond the fixed part 21 of handle 20.

At the top, the back 40 is completed by a top support 43 integral with the telescopic part 22 of the handle, directly under the arc 31 of grip 30.

The FIGS. 7A-7C illustrate the truck in its various configurations, without any representation of the load.

The FIG. 7A is a front view of the truck in the standing position. The truck is standing on its nose plate 41 and on the end of the two track modules 50. The rolling component 70 is retracted and the wheels are brought into the high position, in line with the chassis. The handle 20 is slightly deployed.

The FIG. 7B shows the truck in the transport position. The handle and the back are inclined slightly and the nose plate 41 is raised. This inclined position corresponds to the deployed position of the two track modules 50, bearing on the running surface.

In this position, the left polygon is defined by the bearing surface of the tracks 50. This surface is relatively long in the direction of travel so that the center of gravity of the load, except in highly exceptional conditions, is always within the lifting polygon formed by the two tracks 54 so that the operator can guide the truck without needing to apply any particular force to hold the load tilted forward or backward.

The FIG. 7C is a view of the truck with the rolling component 70 deployed in the active position. The wheels 71 protrude beyond the contour of the tracks and the truck can be rolled without using the tracks.

The FIGS. 8A-8C show the method of passing over steps with the truck. The FIGS. 8A, 8B show the lifting movement of the truck with the operator placed in the natural position behind it, on the track module 50 side, with the load, not shown, being on the front side and pressing against back 40, retained by nose plate 41. The truck swings from the standing position with a load as shown in FIGS. 7B, 7C by tilting about the wheels 53 of the two modules 50, to tilt the modules and bring the nose N1 over the first step. This inclination is then maintained as far as the second step nose and the movement continues automatically (FIG. 8B) for the following steps.

The inclined position shows that, even in this case, the center of gravity of the load is essentially situated within the lifting polygon comprised by the track modules so that the operator simply requires to apply relatively low force to hold the truck in position.

The FIG. 8C shows the opposite arrangement of the truck, for moving up and for moving down. For moving up, the operator is in front of the track modules 50. This position can be advantageous in allowing the operator to direct the truck accurately in narrow passages, for instance a narrow staircase, not so easy if the operator is at the back as shown in the FIGS. 8A, 8B.

This position is also advantageous for going down the steps with a load because, in this case, the load is placed in front of the operator.

The so-called handling truck described above is to be considered in the very general sense of a means for transporting a load, rolling over a smooth and regular surface, or an irregular surface, or even steps. The surface can be horizontal or inclined.

The FIGS. 9, 10, 11 show another embodiment of the handling truck differing from that described above through the track modules 54 which the locking mechanism 55 is replaced by a locking device 155 comprising an electric actuator 1551 replacing the slide lever 551. The electric actuator 1551 is controlled from the grip 30 and allows the tilting angle of the back 40 to be adjusted with respect to the bearing surface of tracks 50 to the floor. The actuator 1551 is connected to the pivot 1552 (FIG. 10) of the track 50 and to the pivot 1553 (FIGS. 9, 10) of the chassis 40. The track 50 pivots with respect to the chassis around pivot 511 of shaft 621. The two electric actuators 1551 of the two tracks 50 are installed in the gap between the tracks 50 and the side walls of the box structure of chassis 40. The two electric actuators 1551 operate synchronously. Travel ends, not detailed here, stop the movement of the actuators 5051 at the end of the swiveling movement on the deployment/retraction of the tracks of 50 with respect to the chassis 40. The swiveling movement of the tracks through the angle α (FIG. 11) allows the center of gravity COG of a transported load CH to be placed so that it remains if possible in the lifting polygon of the tracks 50. To do this, according to FIG. 11, the center of gravity COG must be in the limits L1, L2. In greater detail, the vertical projection of the center of gravity COG, onto the horizontal plane, must remain within the lifting polygon formed by the tracks 50, representing the bearing points of the loaded truck on the horizontal plane.

If the load CH is in asymmetrical position with respect to the plane of symmetry of the truck, the center of gravity COG must be located between the vertical lines L1, L2 representing the front and back limit planes of the lifting polygon.

In practice, starting from the position in which the load CH is picked up on the floor, for which the nose plate 41 bears on the floor under the load and the center of gravity COG is not projected into the lifting polygon, the operator orders the opening of the angle α (α+) to tilt the chassis 40 and the load CH back until he feels that there is no retaining force needed on the grip 30. However, this tilting will be limited to a convenient tilting angle of the chassis 40 beyond which the grip 30 would be placed too low. For a low load CH, the center of gravity CO G may not enter the lifting polygon but approach it, thus reducing the force to be supplied by the operator to hold the loaded truck and maneuver it.

On reaching the destination, the operator applies the opposite tilting movement (α−) to redress the truck 40 and the load CH, and to unload the truck.

The FIG. 12 shows another variant of the trucks according to the first or second embodiment; this embodiment includes a retracting support 80 at the base of chassis 40 and in particular, a support built into the telescopic handle 20, or associated with it.

Bearing 80 consists of a foot 81 controlled by an electric actuator 82 housed in the fixed part 21 of the handle 20, from grip 30. The foot 81 is extended by the operator when the loaded truck is climbing or descending stairs, so that the truck is prevented from tipping backwards in an incident or a wrong maneuver. The bearing 80 is set preferably between a retracted position and an extended position, without there being an intermediate position. The deployed position depends on the geometry of the truck and is locked to make the truck safe.

The truck is in an inclined position but as soon as its lifting is liable to cause it to tilt backwards, the foot 81 comes into contact with a step, stopping the swiveling movement: this recumbent position is shown, for instance, in FIG. 13.

Another embodiment complementing those described above is shown in FIG. 13. In this embodiment, the truck has an auxiliary module 90 consisting of a triplet of wheels 91 with the three wheels 91*a,b,c* being supported by a three-armed support 92 at equal angles. The support is mounted on a swivel 53 supported by an arm 49 shown as bent for the needs of the drawing. This arm 94 is a cantilever arm connected to the chassis 40 by an articulation point; the end of the arm 94 is connected to an electric actuator 95 also connected by a swivel 96 to the chassis 40 in order to control the deployment and retraction of the triplet of wheels 91.

The auxiliary module 90 as shown, placed in front of (above) the tracks 50, in the plane of symmetry of the truck, can comprise a single triplet 91 or two twin triplets; in the latter case, the arm 94 and the actuator 95 are placed in the plane of symmetry in which case the arm 94 is straight.

With the loaded truck in the recumbent position, most of the load presses on the chassis 40, at the level of the modules 50, so that the tracks 54 catch all the better on the steps noses N1.

The auxiliary module 90 completes the truck in order to pass over noses N1-N4 of the steps M1 . . . M4 of a staircase, in the recumbent position, pushed by the track modules 50.

In the deployed position, as in FIG. 13, the module 90 constitutes a front support in the climbing direction.

In the climbing direction, the modules 50 push the truck and caused the active wheel 91*a* (in the position shown here) to run on the top of the step M2 so that it abuts against the riser CM3; the thrust then causes the triplets of wheels 91 to tip so that the next wheel 91*b* passes over the nose N3 to run on the top of the step M3 and so on.

During this maneuver, the operator does not need to pull on the handle 20 and on the grip 30 because the modules 50 are pushing the truck.

During the descending of the loaded truck, in the recumbent position, the models 50 brake the movement and the auxiliary module 90, so that the swiveling of the triplet 91 is generated by the weight applied through the pivot 93 causing the triplets to turn in the opposite direction.

The FIGS. 14-18 show a truck with another embodiment of the auxiliary wheel module 100 in which the basic structural components bear the same references as above, and the description of which will not be repeated.

The auxiliary module 100 is connected to the handle 20 of the truck so that it can be moved; it can be placed in the deployed position or the retracted position.

The running module 100 has a caliper 104 in an inverted U shape, connected by a 141 two and articulated quadrangle shaped arm 105, connected to hinge on an attaching part 106, itself connected to the handle 20.

The caliper 104 has a connecting rod 142 designed for directing and guiding the module 100 about the axis of pivot 141. The connecting rod 142 is connected to the caliper 104 by a horizontal hinging 143.

The arm 105 consists of a lower arm 105 and a double upper arm 152; the arms are connected by pins 153. The attaching part 106 is the interface for the connection of the arm 105 to the truck.

The arm 105, hinged on the attaching part 106, locks to prevent it from swiveling with respect to this part.

The FIGS. 14-18 are a schematic view of the geometry of running module 100 of the truck, designed to make it easier to cross an obstacle or a small variation of relief, such as a change in sidewalk level when the truck is being moved on the flat (FIG. 15) or of negotiating a step or a series of steps.

In order not to make the description complicated, and allowing for the ternary symmetry of the running module 100, the references are not completed by an index associated with each of the ternary symmetry components of the running module, to simplify the presentation.

The running module 100 comprises a star-shaped support 101 with three arms 111 set out at equal angles, in the form of an equilateral triangle the apexes of which correspond to the three shafts 121 of the wheels 102 forming a wheel triplet.

The center 112 of the support 101 forms the pivot 112.

In this type of embodiment, the wheels 102 have the same radius and the shaft 121 of a wheel 2 is at the same distance from the center 112 forming the pivot. The support 101 is made up of two flanges, for instance, attached by a sleeve receiving the pivot 112.

In FIG. 14, the module 100 is in position ready to be lowered onto the ground by the swiveling of the handle 20 carrying it around the pivot of the tracks 50 to reach the position shown in FIG. 15.

In this position "on the flat", the truck can be guided by its connecting rod 142, combined with the duplicated controls on the connecting rod or on the track. This position of the truck is exceptional for passing a difficult, narrow or shallow position, and above all for running on the flat over the stairs of a staircase.

FIG. 16 shows the auxiliary module 100 in the folded position against the step 20 with the connecting rod 142 lowered and the end grip housed against the chassis between the track modules 50. This position of the module 100, with its connecting rod, is locked to be immobilized and not to enter the normal operation of the truck using the track modules 50 or the running component 70 with the two wheels 71.

FIG. 17 shows and other form assumed by the truck and its auxiliary module 100. The truck is neither standing nor recumbent but inclined while bearing, in this case, at the rear, on the two track modules 50 and at the front, on module 100. The module 100 is deployed by its arm 105 and the actuator (154) electric actuator), mounted between its arm 151 and the part 106.

In this position, the weight of the load lies essentially on the track modules 50 and control to direct the truck is by the connecting rod 142.

The FIGS. 18-20 show another embodiment of the module which is a tracked wheel triplet module 200. In the same way as previously, details of the truck bearing the same references as above will not be described again.

The module 200 differs from the previously described module 100 in its rolling components consisting a triplet of wheels 202 carried by three-arm 211 support 201 the center 212 of which is connected to a caliper 204, itself assembled to swivel on an arm 205, by its hinge point 241. The arm 205 is connected to an attaching part 206 for attachment to the truck, that is, to its handle 20.

The arm 205 is in the shape of a hinged quadrangle with a lower arm 251 and a duplicated upper arm 252. The arms are connected by hinges 253 to the pivot 241 and to attaching part 206. The arm 205 has an electric actuator mounted between the lower arm 251 and the attaching part 206 to deploy and retract the arm 205, as in the previous example.

Details of the track rolling components of the module 200 are shown in FIG. 20.

FIG. 20 is a schematic view of the geometry of a truck module 200 rolling element.

In the figures, the references are completed by an index associated with each of the ternary elements of symmetry of the running module, for better understanding.

The running element of module 200 consists of a star-shaped support 201 with three arms 211 set out at equal angles in the form of an equilateral triangle the apexes of which correspond to the three shafts 221 of the wheels 202.

The center 212 of the support 201 is the pivot for a pivoting assembly on the on 205 of the truck.

The wheels 202 have the same radius (R) and the shaft 221 of a wheel 202 is at the same distance (d) from the center 212 forming the pivot of the support 1.

The shaft 221 ($221_1$) of one of the wheels 202 ($2022_1$) is mounted to be adjustable in the radial direction of the support to adjust the tension of the ribbon of track 203 and/or facilitate the assembly/disassembly of the ribbon, or its replacement. Accordingly, the bearing of the shaft $221_1$ is supported by a slide 233 housed in a runner 213 of the support. The slide 233 is supported by a threaded rod 224, supported on the runner to adjust and lock the slide 233 in the runner 213.

As shown in this example, the support 201 comprises two flanges, for instance made integral by a sleeve 214 receiving the pivot 212 with each flange having a slide 223 supporting the corresponding end bearing of the shaft and a threaded rod 224, adjusting and locking the corresponding end bearing of the shaft $221_1$.

This tensioning can also be obtained with an eccentric.

Depending on the obstacles in the way of the running module 200, on surface S on which it bears and over which it moves, the module does not pivot automatically about the shaft 211 and runs on the segment $z_{2-3}$ of the ribbon 203 between the wheels $202_2$ and $202_3$ shown in the bearing position.

When the module 200 comes up against an obstacle, it passes over the obstacle like a traditional track, without swiveling about pivot 212 or swiveling around the obstacle; this depends on several parameters, some specific to the module 200 and others depending on the shape and height of the obstacle as well as the components of the thrust or pulling force (angular orientation and intensity) and the load being carried, applied to the pivot 212.

If the obstacle encountered is low, less than the radius R of the wheel $202_2$ the curved part of the track 203, which is also that of the wheel $202_2$, and for a drive force parallel to the surface of the floor S, will enable the module 200 to pass over the obstacle without pivoting, all the more so in that module 200 is also subjected to the transported weight so that the shaft 212 to which the weight of the load and the drive force is applied, does not lift to swivel about shaft $221_2$ of wheel $202_2$ when it encounters this obstacle.

In the case of an obstacle of a certain height, like a step, the wheel $202_2$ remains blocked against the obstacle and the module 200 can only pass it by swiveling.

The choice of the radius R of the wheels 202 will depend on the applications of the rolling module 200 and on the possible or desired gauges (envelope curve radius).

The tension of the track 203 and its positioning on the triplet of wheels 202 are advantageously set by the tension adjusting device of the track 203, associated with one of the wheels, for instance wheel 202₁.

In a variant, not shown, the ribbon 203 and the track have a rib standing in relief in the middle of the inner surface and the wheels 202 have a groove in the center, in a position matching the rib and designed to accommodate it, guiding and centering the track ribbon 203.

Depending on whether the truck is intended to transport bulky, heavy loads, or light loads, the mechanical properties will be adjusted. This applies notably to the design of the chassis and the power of the drive motor.

NOMENCLATURE

10 Chassis
110 Side
120 Cross brace
20 Telescopic handle
21 Fixed part/Fixed tube
22 Telescopic part/Telescopic tube
221 Upper end
222 Longitudinal opening
23 Locking screw
231 Key
232 Shim
30 Grip
31 Arc
32 Left/right control button
33 Emergency stop
40 Back
41 Nose plate
42 Arc
43 Top support
50 Track module
51 Module body
51a,b Plate
511 Bearing
52 Drive wheel
521 Bearing
53 Free wheel
531 Shaft
532 Bearing
533 Slide
534 Screw
535 Head
536 Window
537 Plate
538 Slot
54 Track
544 Cross rib
55 Locking mechanism
551 Lever
532 Pivot
553 Runner, curved
554 March, retaining
555 Start, maneuvering
56 Roller, bearing
57 Cover
58 Cover, retractable
60 Drive unit
61 Electric motor
62 Transmission/differential
621 Shaft
63 Battery
64 Control circuit
70 Running component
71 Wheel
72 Shaft
73 Arm
731 Arm end
74 Pivot
75 Air spring
80 Bearing point
81 Foot
82 Electric actuator
90 Auxiliary module
91 Triplet of wheels
91a,b,c Wheels
92 Support, three armed
93 Pivot
94 Arm
95 Electric actuator
96 Pivot
155 Locking mechanism
1551 Electric actuator
1552 Pivot
1553 Pivot
100 Auxiliary wheel module
101 Support
111 Arm
112 Center/pivot
104 Inverted U-shaped caliper
141 Pivot
142 Connecting rod
143 Connecting rod hinge
105 Arm
151 Lower arm
152 Duplicated upper arm
153 Hinge
106 Attaching part
200 Auxiliary track wheel module
201 Support
211 Arm
212 Center/pivot
213 Slide
202 Wheel
202₁, 202₂, 202₃ Wheels
221 Wheel shaft
221₁, 221₂, 221₃ Wheel shafts
223 Slide
224 Threaded rod
203 Track ribbon
204 Inverted U-shaped caliper
241 Pivot
242 Connecting rod
243 Connecting rod hinge
205 Arm
251 Lower arm
252 Duplicated upper arm
253 Hinge
206 Attaching part
COG Center of gravity of load
CH Transported load
L1, L2 Lifting polygon limits
$\alpha$ Angle between the plane of the chassis and the bearing surface of the track modules
R Wheel radius
d distance between the center of the wheel and the pivot
S Running surface/floor
$Z_{2\text{-}3}$ Module bearing surfaces

What is claimed is:

1. Truck-type handling truck with a chassis and a back, and a low section, a nose plate attachment and two wheels, characterized in that it includes:
   a motor unit (60) mounted to the chassis (10) and having an electric motor (61) connected to a differential transmission (62) with two lateral output shafts (621),
   two track modules (50), each connected to a shaft (521) of the motor unit (60) and mounted to swivel about this shaft independently, between a position aligned on the chassis and a deployed position.

2. Handling truck according to claim 1, characterized in that the track module (50) has a body mounted to swivel about shaft (621) of transmission (62), bearing the drive wheel (52) of module (50) with the module having a second free wheel (53) whose axis is parallel to that of the drive wheel (52) and over which the track (54) passes, as well as a locking mechanism (551, 552, 553, 554, 555) connecting the body (51) of the module to chassis (10) to block the two positions of each module (50) with respect to chassis (10).

3. Handling truck according to claim 1, characterized in that the module (50) has two wheels, the drive wheel (52) and the free wheel (53) and an intermediate bearing (56) standing back with respect to the lower tangent to the two wheels (52, 53).

4. Handling truck according to claim 1, characterized in that it includes a running element (70) that includes a pair of wheels (71) fitted to a shaft (72) supported by two arms (73) each connected to a pivot (74) on chassis (10) and moving between a stable retracted position above the track module (50) and a lowered stable running position under the tracks (54) with the wheels protruding beyond the tracks to roll on the ground without the tracks touching it.

5. Handling truck according to claim 1, characterized in that the track module (50) has a body mounted to swivel about shaft (621) of transmission (62), bearing the drive wheel (52) of module (50), the module having a second free wheel (53) whose axis is parallel to that of the drive wheel (52) and over which the track (54) passes, with a locking mechanism (155) connecting the body (51) of the module to chassis (10), this locking device comprising an electric actuator for adjusting the position of the module (50) with respect to the chassis while the actuators of the two modules (50) move synchronously.

6. Handling truck according to claim 1, characterized in that the chassis (10) has a telescopic handle (20) the fixed part (21) of which is integral with the chassis and whose telescopic part (22) has a maneuvering handle (30) at its end.

7. Handling truck according to claim 5, characterized in that the grip (30) is arc-shaped (31) protruding on either side of the end of handle (20) to form lever arms.

8. Handling truck according to claim 5, characterized in that underneath the grip (30), the handle (20) has a top bearing (43) supported by the telescopic part (22).

9. Handling truck according to claim 1, characterized in that it has a retractable bearing (80) at the base of the chassis (40) comprising a foot (81) mounted to be mobile and sliding by means of an actuator (82).

10. Handling truck according to claim 9, characterized in that the bearing is housed in the fixed part (21) of the handle (20).

11. Handling truck according to claim 6, characterized in that the end of the telescopic part (22) of handle (20) is at an angle with respect to the support plane formed by the telescopic handle (20) and the back (40) in order to be positioned under this plane, with the other side taking up the load.

12. Handling truck according to claim 1, characterized in that the back (40) consists of the fixed part (21) of the handle (20) and two longitudinal arcs (42) on either side of the fixed part of the handle.

13. Handling truck according to claim 1, characterized in that it includes an auxiliary module (90) comprising at least three wheels (91) supported by an arm (94) connected to the chassis (40) and by an electric actuator (95) to swivel between a retracted position and a deployed position more extending down from the two track modules (50) while assuming a central position symmetrical to the plane of symmetry of the truck.

14. Handling truck according to claim 1, characterized in that it includes a rolling module (200) that includes three wheels (202) supported by a support (201) forming a three-arm star (211) at equal angles to form an equilateral triangle, the assembly being mounted to pivot freely about a shaft (212) passing through the center of support (201), with one ribbon of track (203) passing over the three wheels (202).

15. Handling truck according to claim 1, characterized in that it includes an auxiliary module (100) comprising at least three wheels (102) and having a support (101) mounted by a swiveling shaft (112) in an inverted U shape bracket (104), connected with an arm (105) in order to swivel.

16. Handling truck according to claim 14, characterized in that the support (201) is mounted by a swiveling shaft (212) in an inverted U shape bracket (204), connected with an arm (205) in order to swivel.

* * * * *